US012788534B2

(12) United States Patent
Wang et al.

(10) Patent No.: US 12,788,534 B2
(45) Date of Patent: Nov. 10, 2026

(54) ORTHODONTIC APPLIANCE, ORTHODONTIC SYSTEM AND METHOD OF USE

(71) Applicant: Solventum Intellectual Properties Company, Maplewood, MN (US)

(72) Inventors: Yizhong Wang, Woodbury, MN (US); Ming-Lai Lai, Afton, MN (US); David K. Cinader, Jr., Woodbury, MN (US)

(73) Assignee: Solventum Intellectual Properties Company, Eagan, MN (US)

( * ) Notice: Subject to any disclaimer, the term of this patent is extended or adjusted under 35 U.S.C. 154(b) by 401 days.

(21) Appl. No.: 18/263,148

(22) PCT Filed: Feb. 4, 2022

(86) PCT No.: PCT/IB2022/050994

§ 371 (c)(1),
(2) Date: Jul. 27, 2023

(87) PCT Pub. No.: WO2022/167995

PCT Pub. Date: Aug. 11, 2022

(65) Prior Publication Data

US 2024/0156574 A1 May 16, 2024

Related U.S. Application Data

(60) Provisional application No. 63/199,989, filed on Feb. 8, 2021.

(51) Int. Cl.
*A61C 7/28* (2006.01)
*A61C 7/14* (2006.01)
*A61C 19/06* (2006.01)

(52) U.S. Cl.
CPC ................ *A61C 7/28* (2013.01); *A61C 7/146* (2013.01); *A61C 19/063* (2013.01); *A61C 7/143* (2013.01)

(58) Field of Classification Search
CPC ...................................................... A61C 7/143
See application file for complete search history.

(56) References Cited

U.S. PATENT DOCUMENTS 6,325,622 B1 * 12/2001 Kelly ....................... A61C 7/30 433/10
6,893,257 B2 5/2005 Kelly
(Continued)

FOREIGN PATENT DOCUMENTS

DE 20319773 U1 3/2004

OTHER PUBLICATIONS

International Search Report received for PCT International Application No. PCT/IB2022/050994, mailed on Apr. 8, 2022, 7 pages.
(Continued)

*Primary Examiner* — Eric J Rosen
*Assistant Examiner* — Courtney N Huynh

(57) ABSTRACT

An orthodontic appliance includes a body. The body includes a first portion defining a slot for receiving an archwire. The body further includes a second portion extending from the first portion along a longitudinal axis. The second portion includes a bottom surface opposite to the first portion. The second portion further includes a lateral surface extending from the bottom surface towards the first portion along the longitudinal axis. The bottom surface and the lateral surface at least partially form an external surface of the body. The second portion defines a cavity at least partially surrounded by the bottom surface. The cavity at least partially extends along a length of the second portion from the bottom surface. The cavity includes a reservoir and at least one passage disposed in fluid communication with the reservoir. The at least one passage extends from the reservoir to the lateral surface.

20 Claims, 13 Drawing Sheets

(56) References Cited

U.S. PATENT DOCUMENTS

| | | | | |
|---|---|---|---|---|
| 2003/0194674 | A1* | 10/2003 | Kyritsis | A61C 7/28 433/8 |
| 2003/0198913 | A1 | 10/2003 | Cinader, Jr. et al. | |
| 2005/0196729 | A1 | 9/2005 | Jessop et al. | |
| 2006/0116561 | A1* | 6/2006 | Tricca | A61B 5/0088 600/309 |
| 2006/0166159 | A1 | 7/2006 | Abels et al. | |
| 2008/0020338 | A1 | 1/2008 | Zakhem et al. | |
| 2012/0156632 | A1 | 6/2012 | Schiller | |
| 2013/0171579 | A1* | 7/2013 | Orikasa | A61C 7/287 433/10 |
| 2015/0245983 | A1* | 9/2015 | Lorentz | A61C 7/12 264/16 |

OTHER PUBLICATIONS

Schnitt, "Antimicrobial Effects of GL13K Peptide Coatings", Jul. 2015, A Thesis, 49 pages.

* cited by examiner

ORTHODONTIC APPLIANCE, ORTHODONTIC SYSTEM AND METHOD OF USE

CROSS REFERENCE TO RELATED APPLICATIONS

This application is a national stage filing under 35 U.S.C. 371 of PCT/IB2022/050994, filed Feb. 4, 2022, which claims the benefit of U.S. Provisional Application No. 63/199,989, filed Feb. 8, 2021, the disclosures of which are incorporated by reference in their entireties herein.

TECHNICAL FIELD

The present disclosure relates generally to an appliance, a system, and a method used in orthodontic treatments, and in particular, to an orthodontic appliance, an orthodontic system for a plurality of teeth and a method of use with the orthodontic appliance.

BACKGROUND

Orthodontic appliances, such as orthodontic brackets, may be used in orthodontic treatments by dental practitioners for moving one or more teeth of a patient from a malposition to a desired position in a dentition of the patient. The orthodontic treatments may improve a facial appearance of the patient. In some cases, the orthodontic treatments may also improve function of the teeth by providing improved occlusion during mastication. However, in some cases, the orthodontic appliances may interfere with oral and dental hygiene of the patient. That is, the orthodontic appliances may cause oral and dental diseases, such as tooth decay, and white-spot lesioning on tooth surfaces that cannot be properly cleaned.

SUMMARY

In one aspect, the present disclosure provides an orthodontic appliance. The orthodontic appliance includes a body. The body includes a first portion defining a slot for receiving an archwire. The body further includes a second portion extending from the first portion along a longitudinal axis. The second portion includes a bottom surface opposite to the first portion. The second portion further includes a lateral surface extending from the bottom surface towards the first portion along the longitudinal axis. The bottom surface and the lateral surface at least partially form an external surface of the body. The second portion defines a cavity at least partially surrounded by the bottom surface. The cavity at least partially extends along a length of the second portion from the bottom surface. The cavity includes a reservoir and at least one passage disposed in fluid communication with the reservoir. The at least one passage extends from the reservoir to the lateral surface.

In another aspect, the present disclosure provides an orthodontic system for a plurality of teeth. The orthodontic system includes an archwire. The orthodontic system further includes a plurality of orthodontic appliances configured to be removably coupled to the archwire. Each orthodontic appliance from the plurality of orthodontic appliances includes a body. The body includes a first portion defining a slot for receiving the archwire. The body further includes a second portion extending from the first portion along a longitudinal axis. The second portion includes a bottom surface opposite to the first portion. The second portion further includes a lateral surface extending from the bottom surface towards the first portion along the longitudinal axis. The bottom surface and the lateral surface at least partially form an external surface of the body. The second portion defines a cavity at least partially surrounded by the bottom surface. The cavity at least partially extends along a length of the second portion from the bottom surface. The cavity includes a reservoir and at least one passage disposed in fluid communication with the reservoir. The at least one passage extends from the reservoir to the lateral surface. Each orthodontic appliance further includes a base. The base includes a first base surface configured to engage the bottom surface of the second portion of the body. The base further includes a second base surface opposite to the first base surface. The second base surface is configured to be attached to a corresponding tooth from the plurality of teeth.

In another aspect, the present disclosure provides a method. The method includes providing an orthodontic appliance including a body. The body includes a first portion defining a slot. The body further includes a second portion extending from the first portion along a longitudinal axis. The second portion includes a bottom surface opposite to the first portion. The second portion further includes a lateral surface extending from the bottom surface towards the first portion along the longitudinal axis. The bottom surface and the lateral surface at least partially form an external surface of the body. The second portion defines a cavity at least partially surrounded by the bottom surface. The cavity extends at least partially along a length of the second portion from the bottom surface. The cavity includes a reservoir and at least one passage disposed in fluid communication with the reservoir. The at least one passage extends from the reservoir to the lateral surface. The method further includes depositing a dental composition within the reservoir of the cavity.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
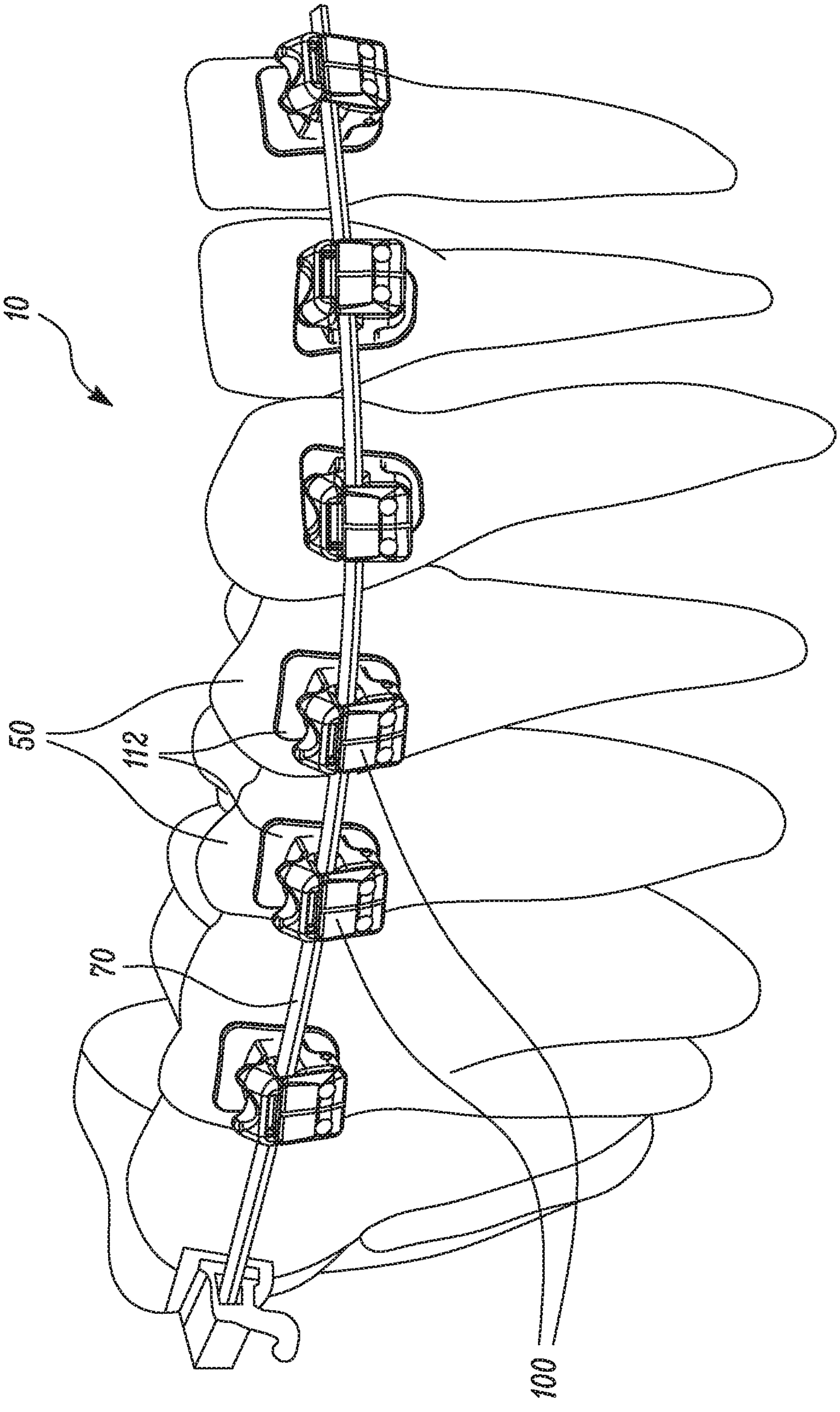
FIG. 1 is a schematic perspective view of an orthodontic system according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to an orthodontic appliance, an orthodontic system, and a method. The orthodontic system, the orthodontic appliance, and the method may be used in orthodontic treatments for moving one or more teeth of a patient from a malposition to a desired position in a dentition of the patient.

The orthodontic appliance includes a body. The body includes a first portion defining a slot for receiving an archwire. The body further includes a second portion extending from the first portion along a longitudinal axis. The second portion includes a bottom surface opposite to the first portion. The second portion further includes a lateral surface extending from the bottom surface towards the first portion along the longitudinal axis. The bottom surface and the lateral surface at least partially form an external surface of the body. The second portion defines a cavity at least partially surrounded by the bottom surface. The cavity at least partially extends along a length of the second portion from the bottom surface. The cavity includes a reservoir and at least one passage disposed in fluid communication with the reservoir. The at least one passage extends from the reservoir to the lateral surface.

A patient undergoing an orthodontic treatment with conventional orthodontic appliances may experience oral and dental diseases, such as tooth decay, and white-spot lesioning on tooth surfaces that cannot be properly cleaned. Fluoride-releasing adhesives used with conventional orthodontic appliances may not be effective for fluoride delivery in an oral environment of the patient. In some cases, conventional methods may lead to excess fluoride release that can potentially cause fluoride toxicity.

The orthodontic appliance of the present disclosure may include a dental composition received within the reservoir of the orthodontic appliance. In some embodiments, a fluoride-releasing composition may be retained within the reservoir. The fluoride-releasing composition may diffuse into an oral environment of the patient from the reservoir via the at least one passage of the cavity. The orthodontic appliance of the present disclosure may provide safe, efficient, sustained and continuous release of fluoride from the fluoride-releasing composition into the oral environment during a course of the orthodontic treatment. Therefore, the orthodontic appliance may reduce or prevent white spot lesions on enamel of the teeth that are otherwise caused by re-mineralization on demineralized surfaces of the teeth. Moreover, the orthodontic appliance may prevent fluoride toxicity while providing a sustained release of fluoride.

Referring now to the Figures, FIG. 1 illustrates an orthodontic system 10 for a plurality of teeth 50 according to an embodiment of the present disclosure. The plurality of teeth 50 may be of a patient undergoing an orthodontic treatment. The plurality of teeth 50 may include one or more of a central incisor, a lateral incisor, a canine, a premolar, a first molar, a second molar, and a third molar. Further, the plurality of teeth 50 may be of a lower dental arch or an upper dental arch of the patient.

The orthodontic system 10 includes an archwire 70. The archwire 70 may be configured to apply forces on the plurality of teeth 50 to move one or more teeth 50 from a malposition to a desired position in a dentition of the patient. In some embodiments, the archwire 70 may include a nickel-titanium (NiTi) alloy. In some other embodiments, the archwire 70 may include any suitable material for applying forces on the plurality of teeth 50. For example, the archwire 70 may include a metal, a metal alloy, a composite, a non-metal alloy, and combinations thereof.

The orthodontic system 10 further includes a plurality of orthodontic appliances 100 configured to be removably coupled to the archwire 70. Each orthodontic appliance 100 from the plurality of orthodontic appliances 100 may be removably coupled to the archwire 70 by removably receiving the archwire 70 within a slot of each orthodontic appliance 100. Further, each orthodontic appliance 100 may be configured to be attached to a corresponding tooth 50 from the plurality of teeth 50. The corresponding tooth 50 may be interchangeably referred to as “the tooth 50”. In some embodiments, each orthodontic appliance 100 further includes a base 112. The base 112 may be configured to be attached to the corresponding tooth 50 from the plurality of teeth 50. Specifically, each orthodontic appliance 100 may be attached to the corresponding tooth 50 by attaching the base 122 of each orthodontic appliance 100 to the corresponding tooth 50.

In the illustrated embodiment of FIG. 1, each orthodontic appliance 100 is attached to the corresponding tooth 50 on a labial surface of the corresponding tooth 50, i.e., a tooth surface toward lips of the patient. In other words, each orthodontic appliance 100 is a labial orthodontic appliance. However, each orthodontic appliance 100 may be attached to the corresponding tooth 50 on a lingual surface of the corresponding tooth 50, i.e., a tooth surface toward a tongue of the patient. In other words, each orthodontic appliance 100 may be a lingual orthodontic appliance. The orthodontic appliance 100 may include any appliance intended to be attached to the tooth 50 and the archwire 70. For example, the orthodontic appliance 100 may include an orthodontic bracket (including self-ligating brackets), an orthodontic buccal tube, an orthodontic cleat, an orthodontic button (aligner attachment), and the like.

In some embodiments, the orthodontic system 10 may be referred to as an orthodontic brace, or "braces". However, in some other embodiments, the orthodontic system 10 may include aligners, retainers, mouthguards, and the like.

Figure 2A:
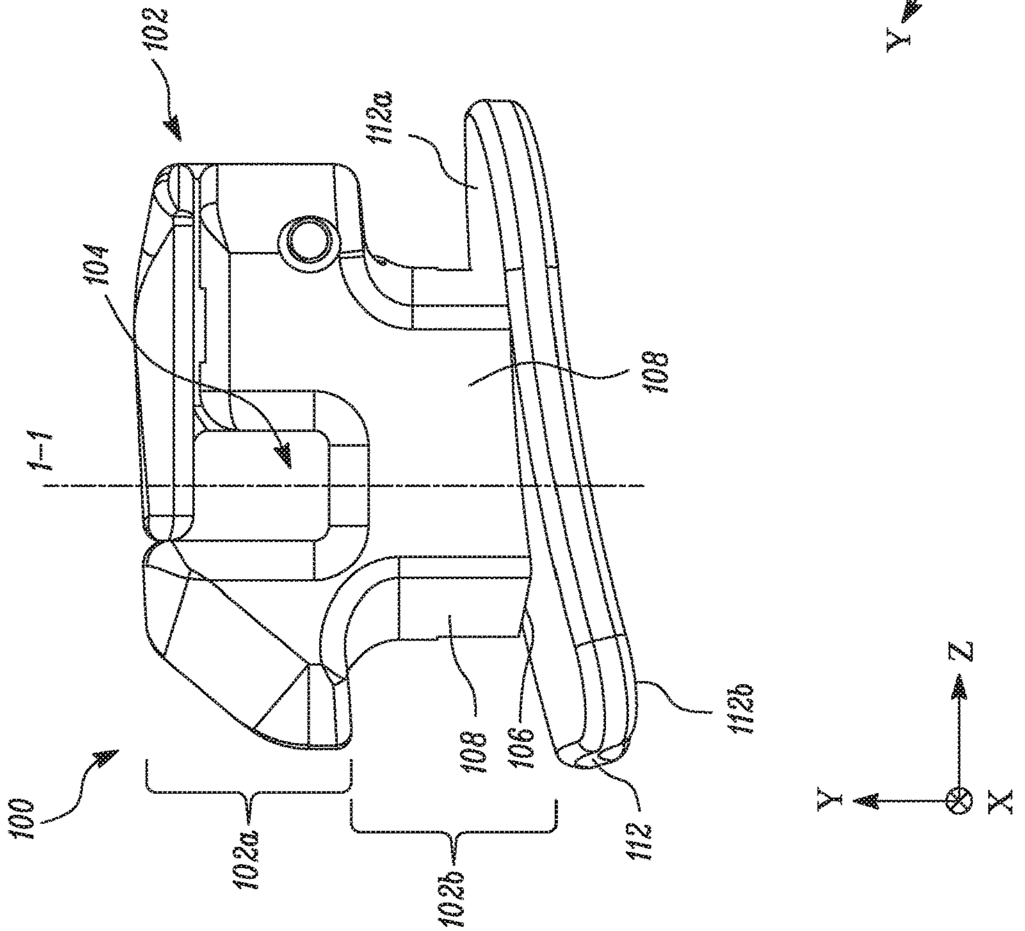
FIG. 2A is a side view of an orthodontic appliance of the orthodontic system according to an embodiment of the present disclosure.
Figure 2B:
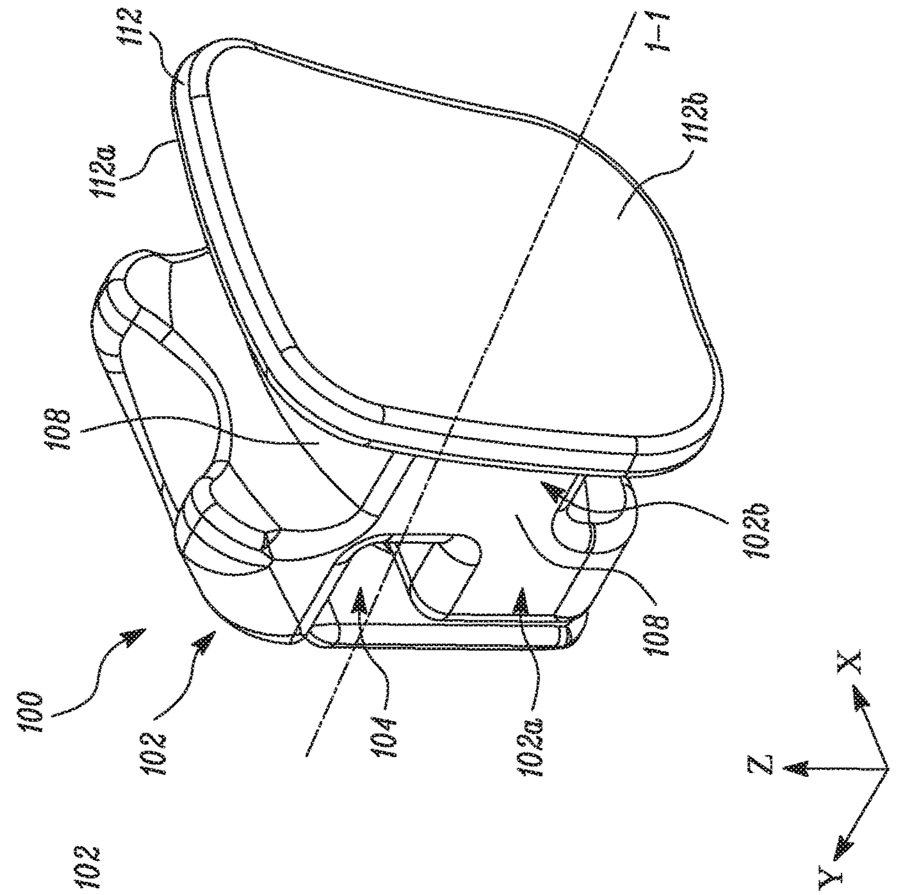
FIG. 2B is a perspective view of the orthodontic appliance of FIG. 2A according to an embodiment of the present disclosure.
Figure 2C:
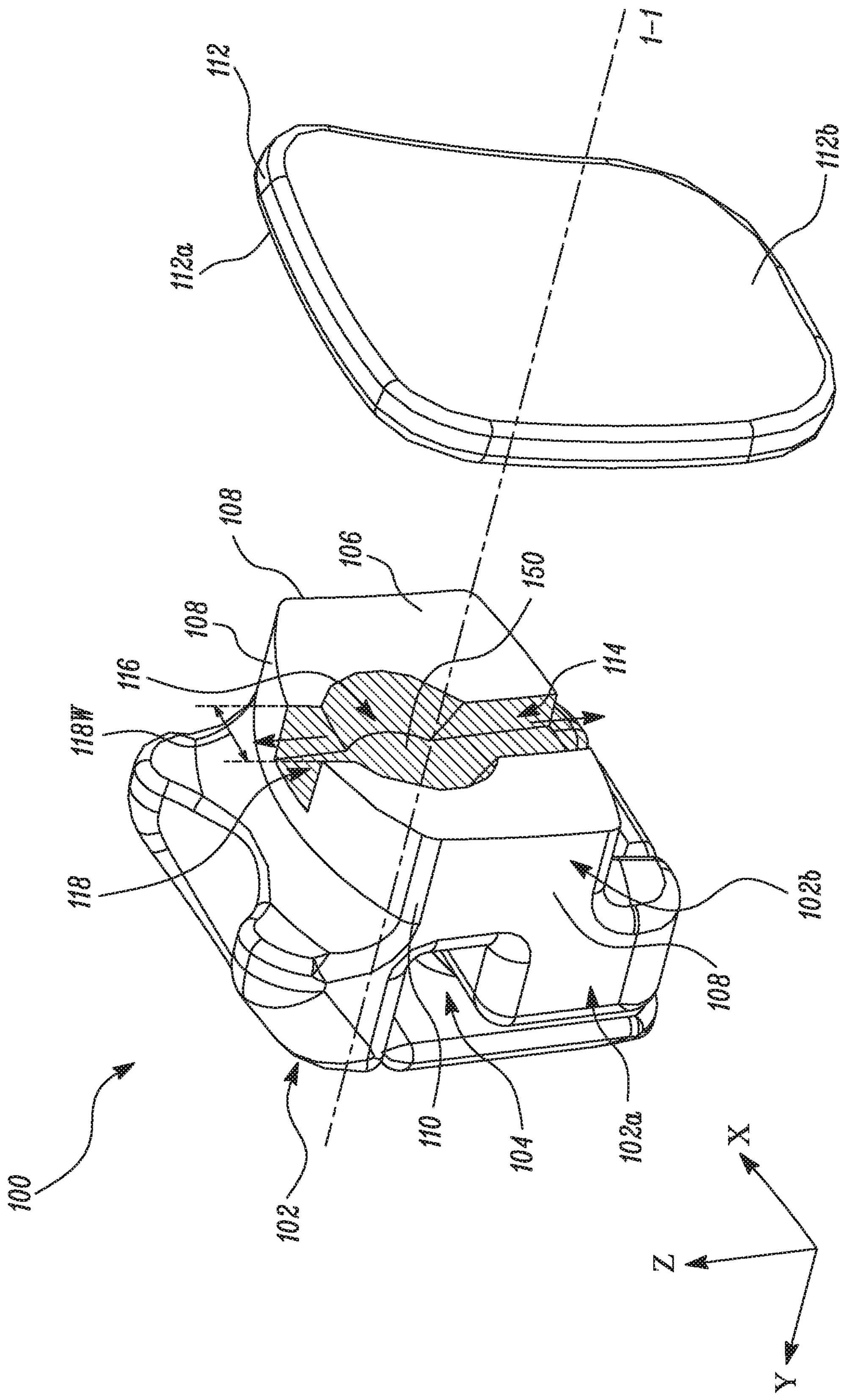
FIG. 2C is an exploded perspective view of the orthodontic appliance of FIG. 2A according to an embodiment of the present disclosure.

FIGS. 2A-2C illustrate the orthodontic appliance 100 according to an embodiment of the present disclosure. The orthodontic appliance 100 defines mutually orthogonal X, Y and Z-axes. The X and Z-axes are in-plane axes of the orthodontic appliance 100, while the Y-axis is a transverse axis disposed along a thickness of the orthodontic appliance 100. In other words, the X and Z-axes are disposed along a plane of the orthodontic appliance 100, while the Y-axis is perpendicular to the plane of the orthodontic appliance 100.

Referring to FIGS. 2A and 2B, the orthodontic appliance 100 includes a body 102. The body 102 includes a first portion 102*a* defining a slot 104 for receiving the archwire 70 (shown in FIG. 1). The body 102 further includes a second portion 102*b* extending from the first portion 102*a* along a longitudinal axis 1-1. In some embodiments, the longitudinal axis 1-1 may be substantially aligned with the Y-axis. The second portion 102*b* includes a bottom surface 106 (best shown in FIG. 2C) opposite to the first portion 102*a*. The second portion 102*b* further includes a lateral surface 108 extending from the bottom surface 106 towards the first portion 102*a* along the longitudinal axis 1-1.

As discussed above, in some embodiments, the orthodontic appliance 100 further includes the base 112. The base 112 includes a first base surface 112*a* and a second base surface 112*b* opposite to the first base surface 112*a*. The first base surface 112*a* is configured to engage the bottom surface 106 (best shown in FIG. 2C) of the second portion 102*b* of the body 102. Furthermore, the second base surface 112*b* is configured to be attached to the tooth 50 (shown in FIG. 1). In other words, the second base surface 112*b* is configured to be attached to the corresponding tooth 50 from the plurality of teeth 50 (shown in FIG. 1). For example, the second base surface 112*b* of the base 112 may have a concave contour that matches a convex contour of a surface of the tooth 50. Optionally, the second base surface 112*b* may be provided with grooves, particles, recesses, undercuts, chemical bond enhancement materials, or any other materials and structures to facilitate bonding or attachment of the second base surface 112*b* to the tooth 50. The second base surface 112*b* may be attached to the tooth 50 by an orthodontic adhesive, an orthodontic cement, or any other suitable bonding agent. Moreover, in some embodiments, the base 112 may be integral with the body 102. In some other embodiments, the base 112 may be manufactured separately and attached to the body 102 by a suitable process (for example, by a laser welding process).

The orthodontic appliance 100 may be made of any suitable material as per desired application attributes. For example, the orthodontic appliance 100 may include metals (such as, stainless steel, titanium, and cobalt-chromium alloys), plastic materials (such as, fiber-reinforced polycarbonate), ceramic materials (such as, fine-grained polycrystalline alumina), polymeric materials, composite materials (such as, glass-fiber reinforced polymeric composites), and combinations thereof. Furthermore, various methods of making the orthodontic appliance 100 may be employed depending upon the materials selected for manufacturing the orthodontic appliance 100. For example, the orthodontic appliance 100 may be manufactured by processes, such as die pressing, slurry casting, injection molding, extrusion processes, rapid prototyping, and the like.

FIG. 2C illustrates an exploded perspective view of the orthodontic appliance 100. As shown in FIG. 2C, the bottom surface 106 and the lateral surface 108 at least partially form an external surface 110 of the body 102. Specifically, each of the bottom surface 106 and the lateral surface 108 form at least a portion of the external surface 110 of the body 102. In other words, the external surface 110 of the body 102 includes the bottom surface 106 and the lateral surface 108. The second portion 102*b* defines a cavity 114 at least partially surrounded by the bottom surface 106. The cavity 114 at least partially extends along a length of the second portion 102*b* from the bottom surface 106. The cavity 114 may at least partially extend along the length of the second portion 102*b* from the bottom surface 106. Specifically, the cavity 114 extends substantially along the longitudinal axis 1-1. In the illustrated embodiment of FIG. 2C, the cavity 114 at least partially extends along the length of the second portion 102*b* from the bottom surface 106. Further, the cavity 114 extends from the bottom surface 106 substantially along the Y-axis.

The cavity 114 includes a reservoir 116. As shown in FIG. 2C, in some embodiments, the reservoir 116 has a circular shape in a plane normal to the longitudinal axis 1-1 of the second portion 102*b*. In some embodiments, the plane normal to the longitudinal axis 1-1 may be the X-Z plane. However, in some other embodiments, the reservoir 116 has at least one of a circular shape, a rectangular shape, a square shape, and a polygonal shape in the plane normal to the longitudinal axis 1-1 of the second portion 102*b*. The reservoir 116 may have other shapes in the plane normal to the longitudinal axis 1-1 of the second portion 102*b*, and is not limited thereto.

The cavity 114 further includes at least one passage 118 disposed in fluid communication with the reservoir 116. The at least one passage 118 extends from the reservoir 116 to the lateral surface 108. Therefore, the at least one passage 118 may fluidly communicate the reservoir 116 with the external surface 110 of the body 102, and hence an oral environment in which the orthodontic appliance 100 is disposed. In some embodiments, the at least one passage 118 may extend from the reservoir 116 to the lateral surface 108 substantially along the Z-axis. In some embodiments, the at least one passage 118 has a width 118W. The width 118W of the at least one passage 118 may be orthogonal to the longitudinal axis 1-1. In the illustrated embodiment of FIG. 2C, the width 118W of the at least one passage 118 may be substantially along the X-axis. Further, the width 118W of the at least one passage 118 may be substantially uniform along a length of the at least one passage 118. The length of the at least one passage 118 may be substantially along the Z-axis.

In some embodiments, the at least one passage 118 is substantially U-shaped in a plane parallel to each of the longitudinal axis 1-1 and the width 118W of the at least one passage 118. In the illustrated embodiment of FIG. 2C, the plane parallel to each of the longitudinal axis 1-1 and the width 118W of the at least one passage 118 may be the X-Y plane. The X-Y plane may include both the longitudinal axis 1-1 and the width 118W. In some other embodiments, the at least one passage 118 may be substantially V-shaped in the plane parallel to each of the longitudinal axis 1-1 and the width 118W of the at least one passage 118. However, a shape of the at least one passage 118 in the plane parallel to each of the longitudinal axis 1-1 and the width 118W of the at least one passage 118 may change as per desired application attributes.

As shown in FIG. 2C, in some embodiments, the orthodontic appliance 100 further includes a dental composition 150 (shown by hatching) received within the reservoir 116. In some embodiments, the reservoir 116 is configured to retain the dental composition 150 within the reservoir 116. The reservoir 116 may retain the dental composition 150 within the reservoir 116 by mechanical interaction of the dental composition 150 and the reservoir 116. The reservoir 116 may secure the dental composition 150 within the cavity 114. That is, the reservoir 116 may prevent the dental composition 150 to be removed from the cavity 114. Therefore, the reservoir 116 may prevent the dental composition 150 from being dislodged into an oral environment of a patient from the cavity 114. In some embodiments, a size of the reservoir 116 may be adjusted according to a volume of the dental composition 150 required, as per desired application attributes.

The dental composition 150 may be exposed to saliva of the patient via the at least one passage 118. Therefore, the dental composition 150 may diffuse (shown by arrows) into the oral environment of the patient from the reservoir 116 via the at least one passage 118 of the cavity 114. The orthodontic appliance 100 may provide safe, efficient, sustained and continuous release of elements from the dental composition 150 into the oral environment of the patient during a course of orthodontic treatments. The elements (for example, fluoride, calcium, strontium, phosphate) released into the oral environment may further deposit on surfaces of the teeth 50 (shown in FIG. 1). Therefore, the orthodontic appliance 100 may reduce or prevent oral and dental diseases.

In some embodiments, the dental composition 150 is at least one of a fluoride-releasing composition, a calcium-releasing composition, a strontium-releasing composition, and a phosphate-releasing composition. The fluoride-releasing composition may diffuse into the oral environment via the at least one passage 118 of the cavity 114. Specifically, the fluoride-releasing composition may be exposed to saliva of the patient via the at least one passage 118. Therefore, fluoride may be released into the oral environment of the patient. Consequently, the orthodontic appliance 100 may reduce white spot lesions on enamel of the teeth 50 that are otherwise caused by re-mineralization on demineralized surfaces of the teeth 50. Examples of the dental composition 150 include, but are not limited to, glass ionomer cement and filling materials, resin modified glass ionomer cement and filling materials, dental sealants, aqueous coating materials, and solvent based polymeric coating materials, and the like. In some embodiments, the dental composition 150 may release fluoride, calcium, strontium, phosphate, buffer, and other elements to manage oral and dental diseases. In some embodiments, the dental composition 150 may be additionally coated on the body 102 of the orthodontic appliance 100. For example, at least a portion of the external surface 110 of the body 102 may be additionally coated with the dental composition 150.

Figure 3B:
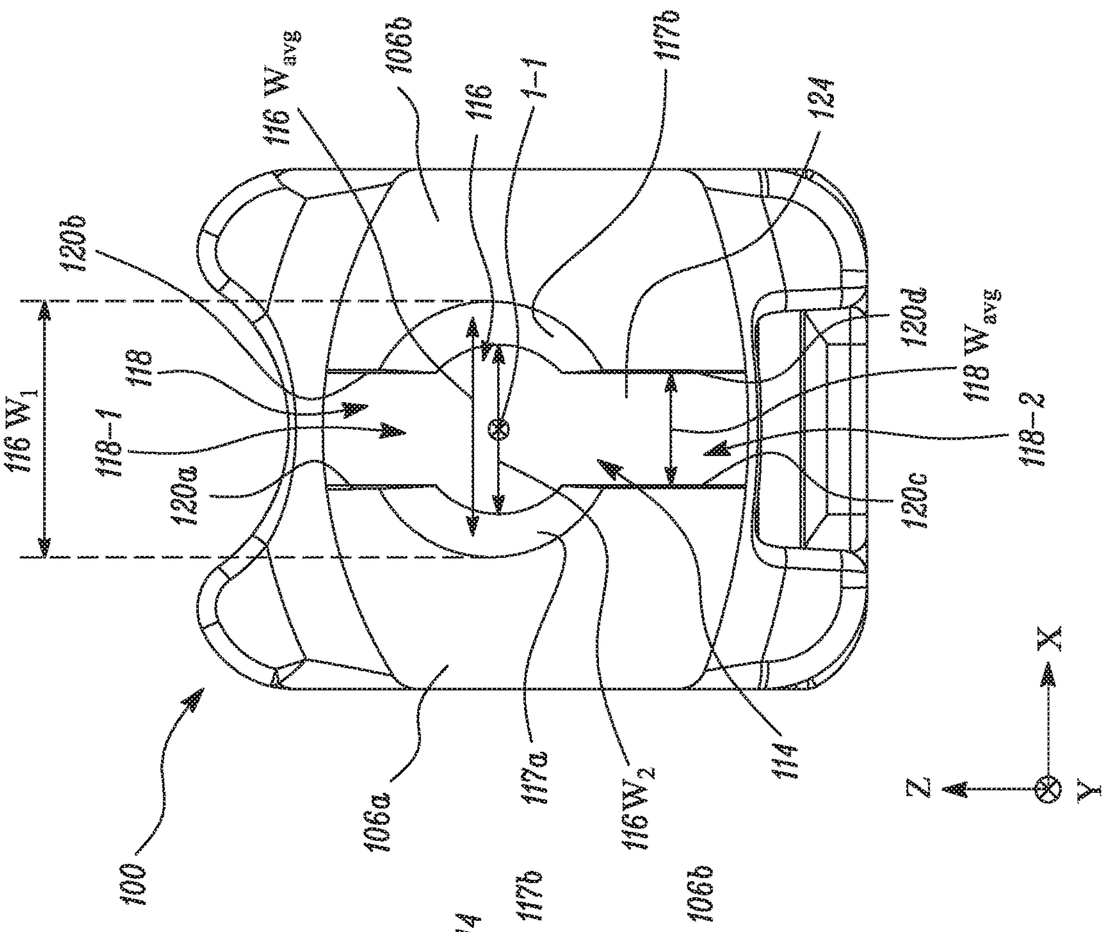
FIG. 3B is a bottom view of the orthodontic appliance of FIG. 3A according to an embodiment of the present disclosure.
Figure 3A:
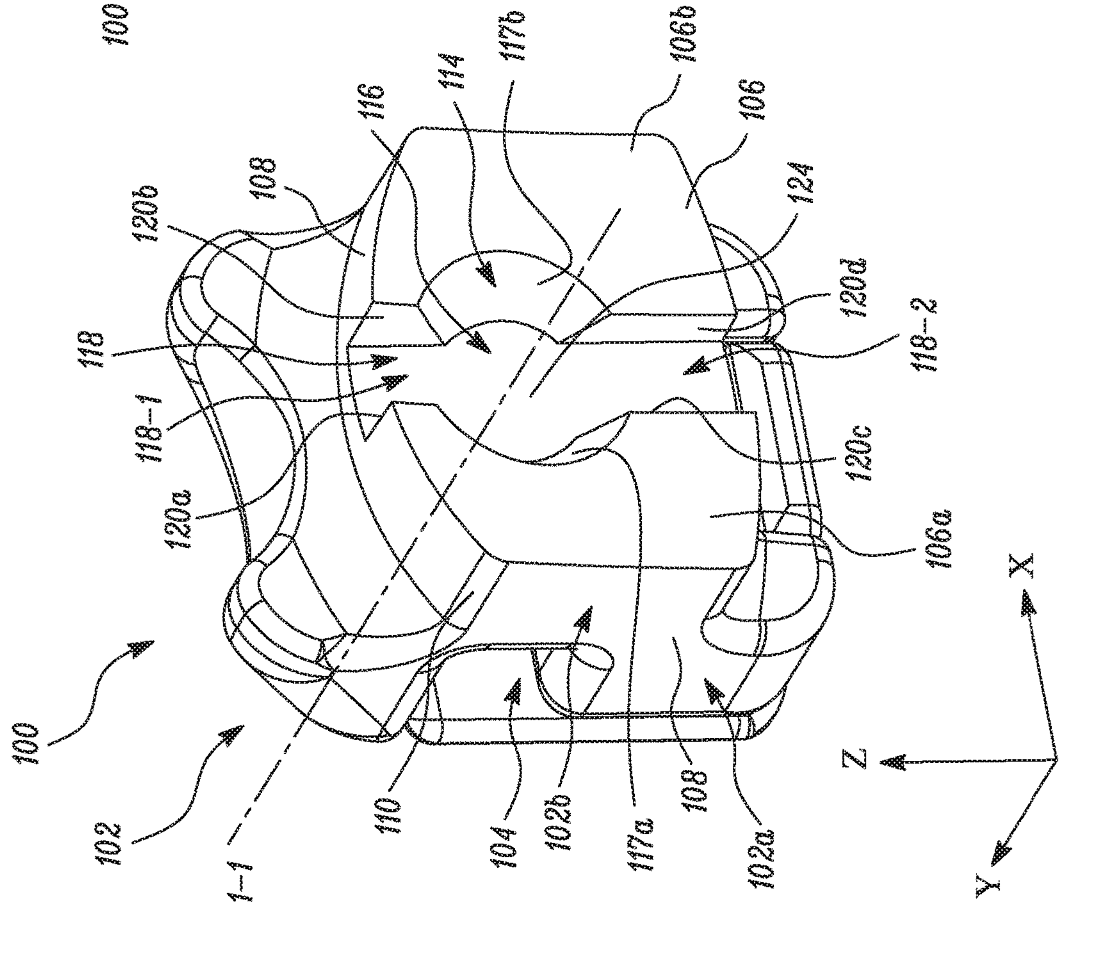
FIG. 3A is a perspective view of the orthodontic appliance without a base according to an embodiment of the present disclosure with the base not shown.
Figure 3C:
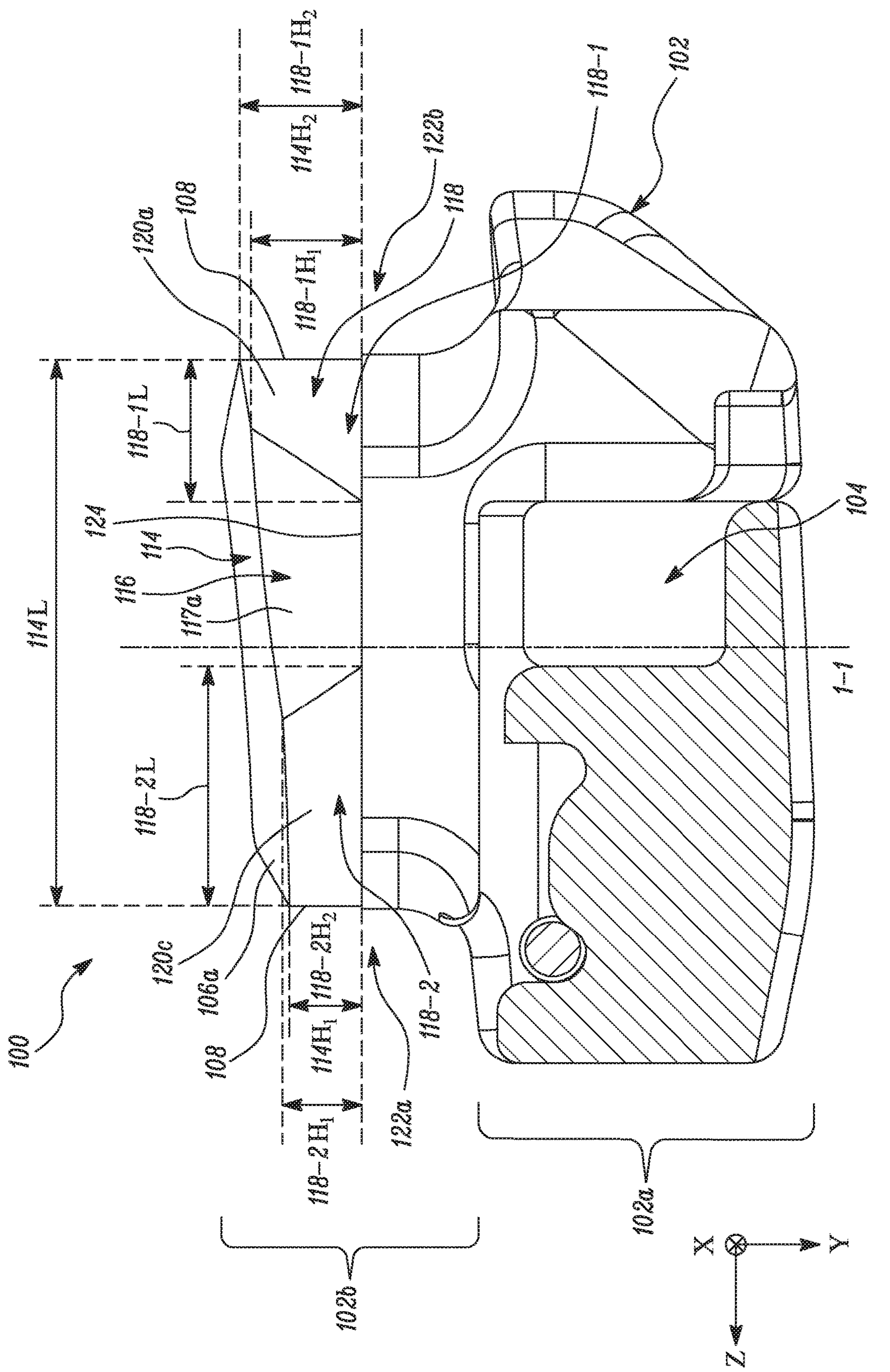
FIG. 3C is a sectional side view of the orthodontic appliance of FIG. 3A according to an embodiment of the present disclosure.

FIG. 3A is perspective view of the orthodontic appliance 100. FIG. 3B is a bottom view of the orthodontic appliance 100. Furthermore, FIG. 3C is a sectional side view of the orthodontic appliance 100 taken along the longitudinal axis 1-1. Specifically, the sectional side view of the orthodontic appliance 100 is taken along the Y-Z plane. The base 112 shown in FIGS. 2A-2C, and the dental composition 150 shown in FIG. 2C are not shown in FIGS. 3A-3C for illustrative purposes.

Referring to FIGS. 3A and 3B, in some embodiments, the bottom surface 106 includes a first region 106*a* and a second region 106*b*. In some embodiments, the cavity 114 is disposed between the first region 106*a* of the bottom surface 106 and the second region 106*b* of the bottom surface 106. In other words, the cavity 114 separates the first region 106*a* from the second region 106*b*.

In some embodiments, the second portion 102*b* further includes a cavity surface 124 offset from the bottom surface 106. The cavity surface 124 may be offset from the bottom surface 106 substantially along the longitudinal axis 1-1. In some embodiments, the cavity 114 extends from the bottom surface 106 towards the cavity surface 124 along the longitudinal axis 1-1. Furthermore, in some embodiments, the cavity surface 124 is substantially planar. For example, the cavity surface 124 is disposed along the X-Z plane.

In some embodiments, at least a portion of the cavity 114 is tapered from the bottom surface 106 to the cavity surface 124. In the illustrated embodiment of FIGS. 3A-3C, the reservoir 116 is tapered from the bottom surface 106 to the cavity surface 124. Specifically, the reservoir 116 is defined by a first reservoir wall 117*a* and a second reservoir wall 117*b*. The first and second reservoir walls 117*a*, 117*b* may extend from the bottom surface 106 to the cavity surface 124 along the longitudinal axis 1-1. As discussed above, the reservoir 116 is tapered from the bottom surface 106 to the cavity surface 124. Consequently, each of the first and second reservoir walls 117*a*, 117*b* is tapered from the bottom surface 106 to the cavity surface 124. The first reservoir wall 117*a* may have a first taper slope, and the second reservoir wall 117*b* may have a second taper slope. In some embodiments, the first taper slope and the second taper slope may be substantially equal. However, in some other embodiments, the first taper slope may be different than the second taper slope.

In some embodiments, the at least one passage 118 includes a plurality of passages 118 spaced apart from each other. Each passage 118 from the plurality of passages 118 extends from the reservoir 116 to the lateral surface 108. In the illustrated embodiment of FIGS. 3A-3C, the at least one passage 118 includes two passages. Specifically, the at least one passage 118 includes a first passage 118-1 and a second passage 118-2. The first passage 118-1 and a second passage 118-2 may be interchangeably referred to as “the at least one passage 118-1” and “the at least one passage 118-2”, respectively.

The first passage 118-1 extends from the reservoir 116 to the lateral surface 108. Furthermore, the second passage 118-2 extends from the reservoir 116 to the lateral surface 108. In some embodiments, each of the first and second passages 118-1, 118-2 extends from the reservoir 116 to the lateral surface 108 substantially along the Z-axis. However, in some other embodiments, each of the first and second passages 118-1, 118-2 may extend from the reservoir 116 to the lateral surface 108 substantially along the X-axis.

In some other embodiments, each of the first and second passages 118-1, 118-2 may be inclined obliquely to each of the X-axis and Z-axis.

In the illustrated embodiment of FIGS. 3A and 3B, the second passage 118-2 is spaced apart from the first passage 118-1. Specifically, the first passage 118-1 is angularly spaced from the second passage 118-2 by about 180 degrees. However, in some other embodiments, the first passage 118-1 and the second passage 118-2 are obliquely inclined to each other. For example, the first passage 118-1 may be inclined to the second passage 118-2 by about 10 degrees to about 80 degrees. In other example, the first passage 118-1 may be inclined to the second passage 118-2 by about 80 degrees to about 170 degrees.

In the illustrated embodiment of FIGS. 3A and 3B, the first passage 118-1 is defined by two passage walls, specifically, a first passage wall 120*a* and a second passage wall 120*b*. Further, the second passage 118-2 is defined by two passage walls, specifically, a third passage wall 120*c* and a fourth passage wall 120*d*. Each of the first, second, third and fourth passage walls 120*a*, 120*b*, 120*c*, 120*d* may extend from the bottom surface 106 to the cavity surface 124 substantially along the longitudinal axis 1-1. In some embodiments, each of the first, second, third and fourth passage walls 120*a*, 120*b*, 120*c*, 120*d* may be substantially planar. In some other embodiments, at least one of the first, second, third and fourth passage walls 120*a*, 120*b*, 120*c*, 120*d* may be curved.

As shown in FIG. 3B, in some embodiments, the reservoir 116 has a maximum width 116$W_1$ at the bottom surface 106. Further, the reservoir 116 has a maximum width 116$W_2$ at the cavity surface 124. The maximum widths 116$W_1$, 116$W_2$ may be orthogonal to the longitudinal axis 1-1. In the illustrated embodiment of FIG. 3B, the maximum widths 116$W_1$, 116$W_2$ are substantially along the X-axis. The maximum width 116$W_1$ at the bottom surface 106 is greater than the maximum width 116$W_2$ at the cavity surface 124. The maximum width 116$W_1$ at the bottom surface 106 may be greater than the maximum width 116$W_2$ at the cavity surface 124 because of the taper of the reservoir 116.

In some embodiments, the reservoir 116 has an average width 116$W_{avg}$. The average width 116$W_{avg}$ of the reservoir 116 may be orthogonal to the longitudinal axis 1-1. In the illustrated embodiment of FIGS. 3A and 3B, the average width 116$W_{avg}$ of the reservoir 116 is substantially along the X-axis. Furthermore, the at least one passage 118 has an average width 118$W_{avg}$ orthogonal to the longitudinal axis 1-1. Specifically, the first and second passages 118-1, 118-2 have the average width 118$W_{avg}$. The average width 118$W_{avg}$ of the at least one passage 118 is substantially along the X-axis. In some embodiments, the average width 116$W_{avg}$ of the reservoir 116 orthogonal to the longitudinal axis 1-1 is greater than or equal to the average width 118$W_{avg}$ of the at least one passage 118 orthogonal to the longitudinal axis 1-1.

Referring to FIG. 3C, in some embodiments, the cavity 114 extends between a first end 122*a* and an opposing second end 122*b*. The cavity 114 has a first height 114$H_1$ at the first end 122*a* along the longitudinal axis 1-1. Furthermore, the cavity 114 has a second height 114$H_2$ at the second end 122*b* along the longitudinal axis 1-1. The first height 114$H_1$ of the cavity 114 is less than the second height 114$H_2$ of the cavity 114. Furthermore, a height of the cavity 114 along the longitudinal axis 1-1 increases monotonically from the first height 114$H_1$ to the second height 114$H_2$ with respect to a length 114L of the cavity 114. In the illustrated embodiment of FIG. 3C, the length 114L of the cavity 114 is substantially along the Z-axis.

In the illustrated embodiment of FIG. 3C, the at least one passage 118-1 has a first height 118-1$H_1$ along the longitudinal axis 1-1 at the reservoir 116 and a second height 118-1$H_2$ along the longitudinal axis 1-1 at the lateral surface 108. Specifically, the first passage 118-1 has the first height 118-1$H_1$ and the second height 118-1$H_2$ at opposing ends of the first passage 118-1. The first height 118-1$H_1$ is different from the second height 118-1$H_2$. Specifically, the first height 118-1$H_1$ is less than the second height 118-1$H_2$. Furthermore, the second height 118-1$H_2$ of the first passage 118-1 is substantially equal to the second height 114$H_2$ of the cavity 114 at the second end 122*b*.

Moreover, in the illustrated embodiment of FIG. 3C, the at least one passage 118-2 has a first height 118-2$H_1$ along the longitudinal axis 1-1 at the reservoir 116 and a second height 118-2$H_2$ along the longitudinal axis 1-1 at the lateral surface 108. Specifically, the second passage 118-2 has the first height 118-2$H_1$ and the second height 118-2$H_2$ at opposing ends of the second passage 118-2. The first height 118-2$H_1$ is different from the second height 118-2$H_2$. Specifically, the first height 118-2$H_1$ is greater than the second height 118-2$H_2$. However, in some embodiments, the at least one passage 118-2 has a substantially uniform height along the longitudinal axis 1-1. That is, the first height 118-2$H_1$ may be substantially equal to the second height 118-2$H_2$. Furthermore, in the illustrated embodiment of FIG. 3C, the second height 118-1$H_2$ of the second passage 118-2 is substantially equal to the first height 114$H_1$ of the cavity 114 at the first end 122*a*.

In some embodiments, the first passage 118-1 has a first length 118-1L, and the second passage 118-2 has a second length 118-2L. The second length 118-2L of the second passage 118-2 is greater than the first length 118-1L of the first passage 118-1. However, in some other embodiments, the first length 118-1L of the first passage 118-1 may be equal to or greater than the second length 118-2L of the second passage 118-2. The first and second lengths 118-1L, 118-2L may be normal to the longitudinal axis 1-1. In the illustrated embodiment of FIG. 3C, the first and second lengths 118-1L, 118-2L may be substantially along the Z-axis. Further, first and second lengths 118-1L, 118-2L are measured along the cavity surface 124 and may correspond to maximum lengths of the first and second passages 118-1, 118-2. Due to a taper of the reservoir 116 in the Y-Z plane, respective lengths of the first and second passages 118-1, 118-2 may vary along the longitudinal axis 1-1.

Figure 4A:
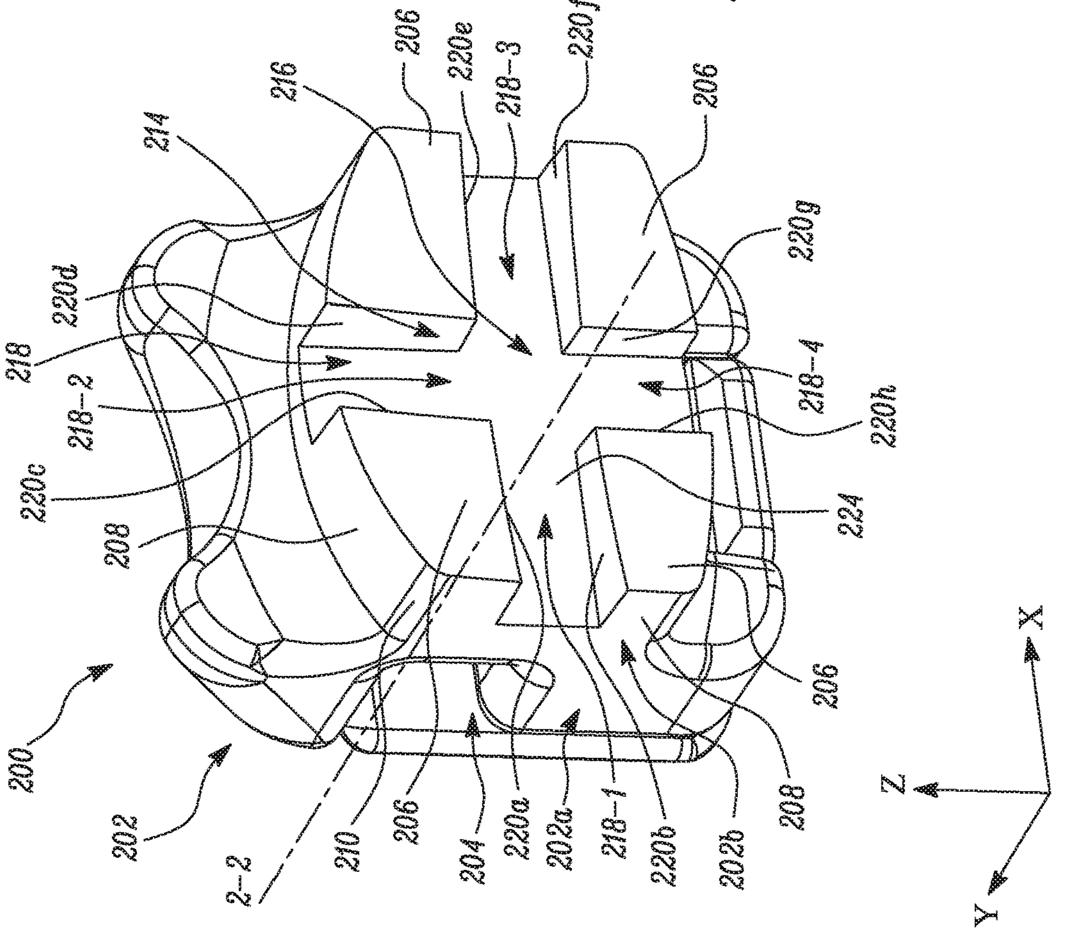
FIG. 4A is a perspective view of an orthodontic appliance according to another embodiment of the present disclosure.
Figure 4B:
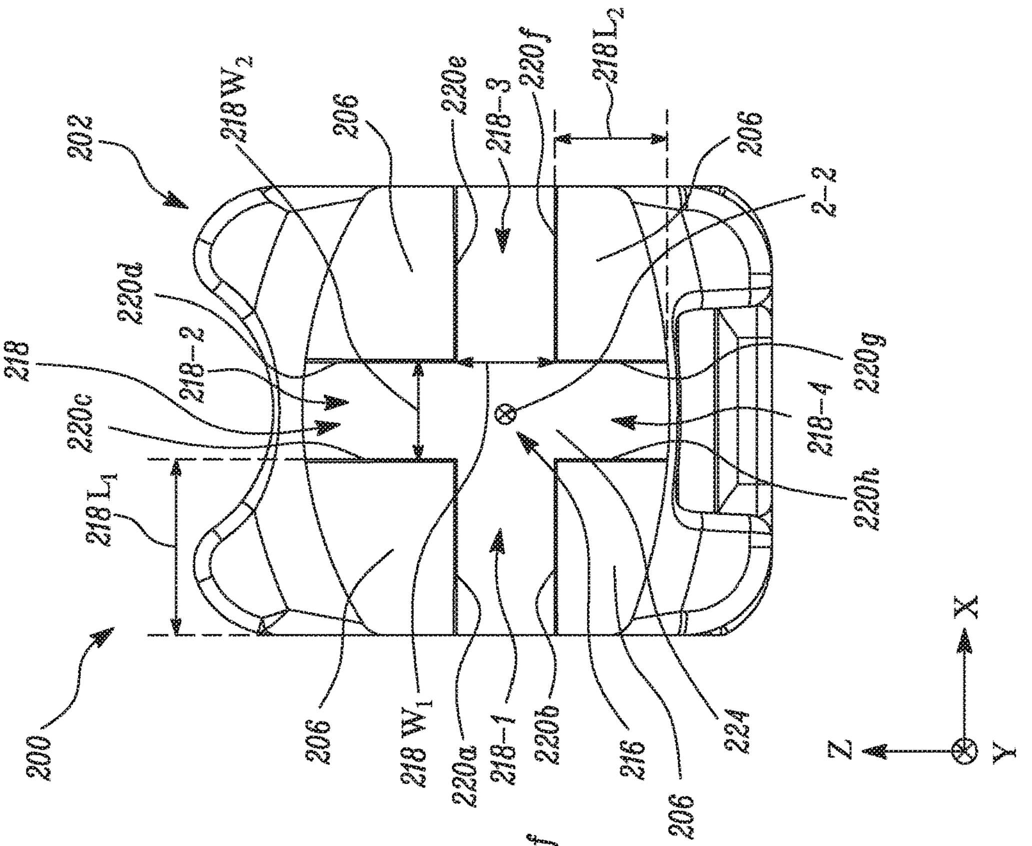
FIG. 4B is a bottom view of the orthodontic appliance of FIG. 4A according to an embodiment of the present disclosure.

FIGS. 4A and 4B illustrate an orthodontic appliance 200 according to another embodiment of the present disclosure. The orthodontic appliance 200 may have a function substantially similar to that of the orthodontic appliance 100 (shown in FIGS. 2A-3C). The orthodontic appliance 200 defines mutually orthogonal X, Y and Z-axes substantially similar to the orthodontic appliance 100. Further, the orthodontic appliance 200 may include a base substantially similar to the base 112 of the orthodontic appliance 100. However, the base of the orthodontic appliance 200 is not shown in FIGS. 4A and 4B for illustrative purposes. Furthermore, the dental composition 150 (shown in FIG. 2C) is not shown in FIGS. 4A and 4B for illustrative purposes.

Referring to FIGS. 4A and 4B, the orthodontic appliance 200 includes a body 202. The body 202 defines a first portion 202*a* and a second portion 202*b*. The first portion 202*a* defines a slot 204 for receiving the archwire 70 (shown in FIG. 1). The second portion 202*b* includes a bottom surface 206 opposite to the first portion 202*a*. The second portion 202*b* further includes a lateral surface 208 extending from the bottom surface 206 towards the first portion 202*a* along a longitudinal axis 2-2. The longitudinal axis 2-2 may be equivalent to the longitudinal axis 1-1 shown in FIG. 3A. The bottom surface 206 and the lateral surface 208 at least partially form an external surface 210 of the body 202.

The second portion 202*b* defines a cavity 214 at least partially surrounded by the bottom surface 206. The cavity 214 at least partially extends along a length of the second portion 202*b* from the bottom surface 206. The cavity 214 may at least partially extend along the length of the second portion 202*b* from the bottom surface 206 substantially along the longitudinal axis 2-2. In the illustrated embodiment of FIGS. 4A and 4B, the cavity 214 at least partially extends along the length of the second portion 202*b* from the bottom surface 206. Further, the cavity 214 extends from the bottom surface 206 substantially along the Y-axis. In some embodiments, the second portion 202*b* further includes a cavity surface 224 offset from the bottom surface 206. The cavity surface 224 may be offset from the bottom surface 206 substantially along the longitudinal axis 2-2. In some embodiments, the cavity 214 extends from the bottom surface 206 towards the cavity surface 224 along the longitudinal axis 2-2.

The cavity 214 includes a reservoir 216 and at least one passage 218 disposed in fluid communication with the reservoir 216. The at least one passage 218 extends from the reservoir 216 to the lateral surface 208. In some embodiments, the at least one passage 218 includes a plurality of passages 218 spaced apart from each other. Each passage 218 from the plurality of passages 218 extends from the reservoir 216 to the lateral surface 208. In the illustrated embodiment of FIGS. 4A and 4B, the plurality of passages 218 includes four passages 218-1, 218-2, 218-3, and 218-4. Specifically, the plurality of passages 218 includes a first passage 218-1, a second passage 218-2, a third passage 218-3, and a fourth passage 218-4. The first and third passages 218-1, 218-3 extend from the reservoir 216 to the lateral surface 208 substantially along the X-axis, and the second and fourth passages 218-2, 218-4 extend from the reservoir 216 to the lateral surface 208 substantially along the Z-axis.

As shown in FIGS. 4A and 4B, in some embodiments, the reservoir 216 is located at an intersection of the four passages 218-1, 218-2, 218-3, 218-4. Furthermore, the reservoir 216 is centrally located with respect to the bottom surface 206. Moreover, the reservoir 216 has a square shape in a plane normal to the longitudinal axis 2-2 of the second portion 202*b*. The plane normal to the longitudinal axis 2-2 of the second portion 202*b* may be the X-Z plane.

In some embodiments, adjacent passages from the plurality of passages 218 are angularly spaced apart from each other by about 90 degrees. In the illustrated embodiment of FIGS. 4A and 4B, the first passage 218-1 is adjacent to the second passage 218-2 and is angularly spaced apart from the second passage 218-2 by about 90 degrees. Further, the second passage 218-2 is adjacent to the third passage 218-3 and is angularly spaced apart from the third passage 218-3 by about 90 degrees. Furthermore, the third passage 218-3 is adjacent to the fourth passage 218-4 and is angularly spaced apart from the fourth passage 218-4 by about 90 degrees. Moreover, the fourth passage 218-4 is adjacent to the first passage 218-1 and is angularly spaced apart from the first passage 218-1 by about 90 degrees.

In the illustrated embodiment of FIGS. 4A and 4B, the first passage 218-1 is defined by a first passage wall 220*a* and a second passage wall 220*b*. Further, the second passage 218-2 is defined by a third passage wall 220*c* and a fourth passage wall 220*d*. The third passage 218-3 is defined by a fifth passage wall 220*e* and a sixth passage wall 220*f*. Furthermore, the fourth passage 218-4 is defined by a seventh passage wall 220*g* and an eight passage wall 220*h*. In some embodiments, each of the first, second, third, fourth, fifth, sixth, seventh, and eighth passage walls 220*a*, 220*b*, 220*c*, 220*d*, 220*e*, 220*f*, 220*g*, and 220*h* may be substantially planar. In some other embodiments, at least one of the first, second, third, fourth, fifth, sixth, seventh, and eighth passage walls 220*a*, 220*b*, 220*c*, 220*d*, 220*e*, 220*f*, 220*g*, and 220*h* may be curved.

In some embodiments, as shown in FIGS. 4A and 4B, the four passages 218-1, 218-2, 218-3, 218-4 include a pair of opposing first passages 218-1, 218-3 and a pair of opposing second passages 218-2, 218-4 substantially orthogonal to the first passages 218-1, 218-3. In some cases, the first and third passages 218-1, 218-3 may be interchangeably referred to as "the first passages 218-1, 218-3". Further, the second and fourth passages 218-2, 218-4 may be interchangeably referred to as "the second passages 218-2, 218-4".

In some embodiments, the first passage 218-1 and the third passage 218-3 may have substantially equal lengths. Therefore, in some embodiments, the first passages 218-1, 218-3 have a first length 218$L_1$. Furthermore, at least one of the second passages 218-2, 218-4 has a second length 218$L_2$. Specifically, the fourth passage 218-4 has the second length 218$L_2$. The first and second lengths 218$L_1$, 218$L_2$ may be orthogonal to the longitudinal axis 2-2. Specifically, in the illustrated embodiments of FIGS. 4A and 4B, the first length 218$L_1$ of the first passages 218-1, 218-3 may be substantially along the X-axis, and the second length 218$L_2$ of the at least one of the second passages 218-2, 218-4 may be substantially along the Z-axis. In some embodiments, the first length 218$L_1$ of the first passages 218-1, 218-3 is greater than the second length 218$L_2$ of at the least one of the second passages 218-2, 218-4. Specifically, in the illustrated embodiment of FIGS. 4A and 4B, the first length 218$L_1$ of the first passages 218-1, 218-3 is greater than the second length 218$L_2$ of the fourth passage 218-4.

Furthermore, in some embodiments, a width of the four passages 218-1, 218-2, 218-3, 218-4 orthogonal to the longitudinal axis 2-2 may be substantially equal. Specifically, a width 218$W_1$ of the first passages 218-1, 218-3 substantially along the Z-axis may be substantially equal to a width 218$W_2$ of the second passages 218-2, 218-4 substantially along the X-axis.

In some embodiments, the orthodontic system 10 (shown in FIG. 1) includes the orthodontic appliance 200. In some embodiments, the orthodontic appliance 200 further includes the dental composition 150 (shown in FIG. 2C) received within the reservoir 216. In some embodiments, the reservoir 216 is configured to retain the dental composition 150 within the reservoir 216. The reservoir 216 may retain the dental composition 150 within the reservoir 216 by mechanical interaction of the dental composition 150 and the reservoir 216. Specifically, a crossed configuration of the cavity 214, i.e., the reservoir 216 and the first, second, third and fourth passages 218-1, 218-2, 218-3, 218-4 may retain the dental composition 150 within the reservoir 216. The reservoir 216 may secure the dental composition 150 within the cavity 214. That is, the reservoir 216 may prevent the dental composition 150 to be removed from the cavity 214. Therefore, the reservoir 216 may prevent the dental composition 150 from being dislodged into an oral environment of a patient from the cavity 214. Furthermore, the orthodontic appliance 200 may provide safe, efficient, sustained and continuous release of elements from the dental composition 150 into the oral environment of the patient during a course of orthodontic treatments. The elements (for example, fluoride, calcium, strontium, phosphate) released into the oral environment may further deposit on surfaces of the teeth 50 (shown in FIG. 1). Therefore, the orthodontic appliance 200 may reduce or prevent oral and dental diseases. In some embodiments, the dental composition 150 may be additionally coated on the body 202 of the orthodontic appliance 200.

Figure 5B:
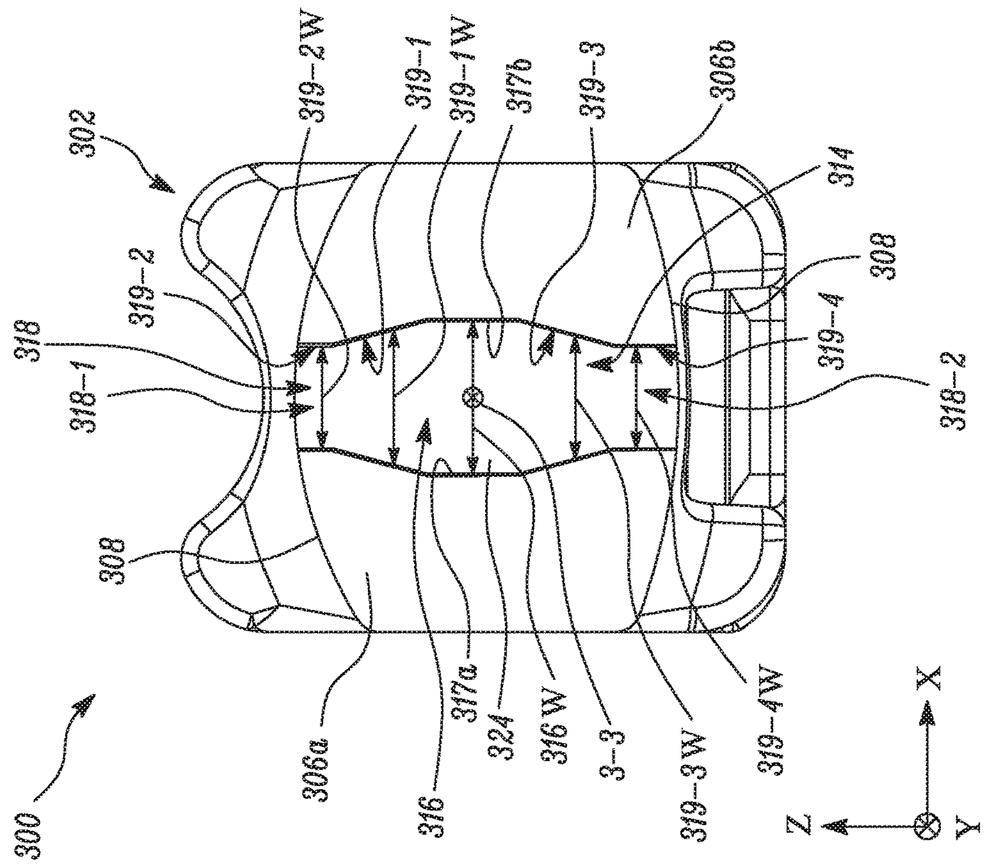
FIG. 5B is a bottom view of the orthodontic appliance of FIG. 5A according to an embodiment of the present disclosure.
Figure 5A:
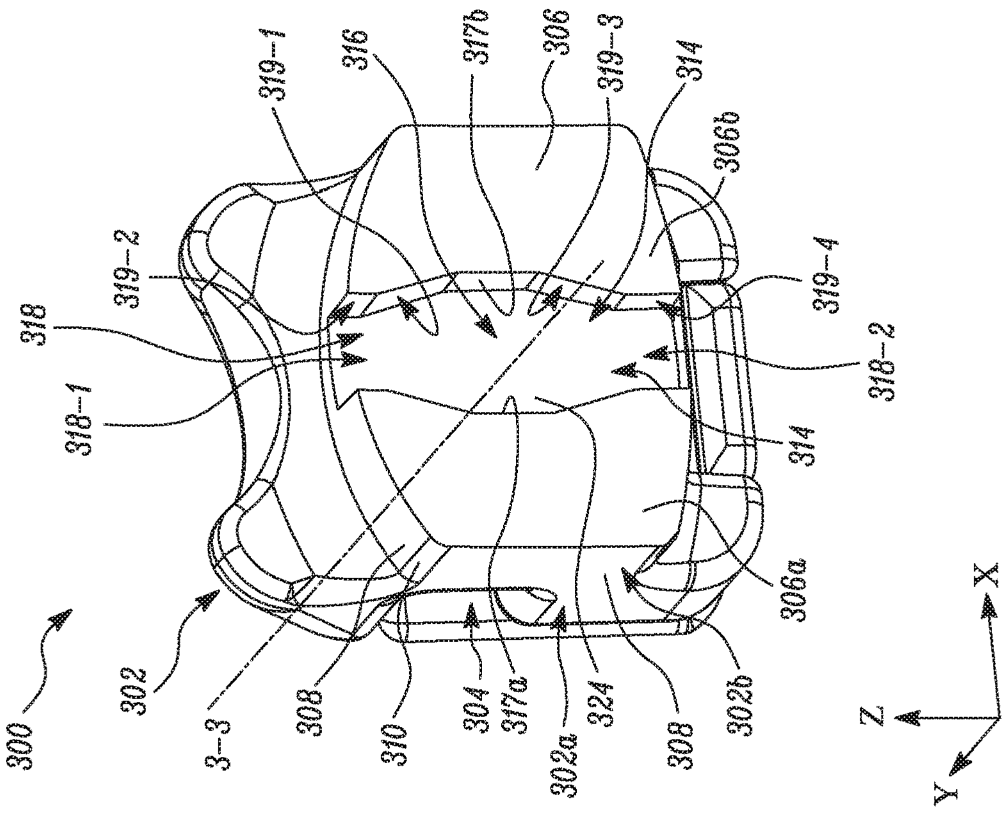
FIG. 5A is a perspective view of an orthodontic appliance according to another embodiment of the present disclosure.
Figure 5C:
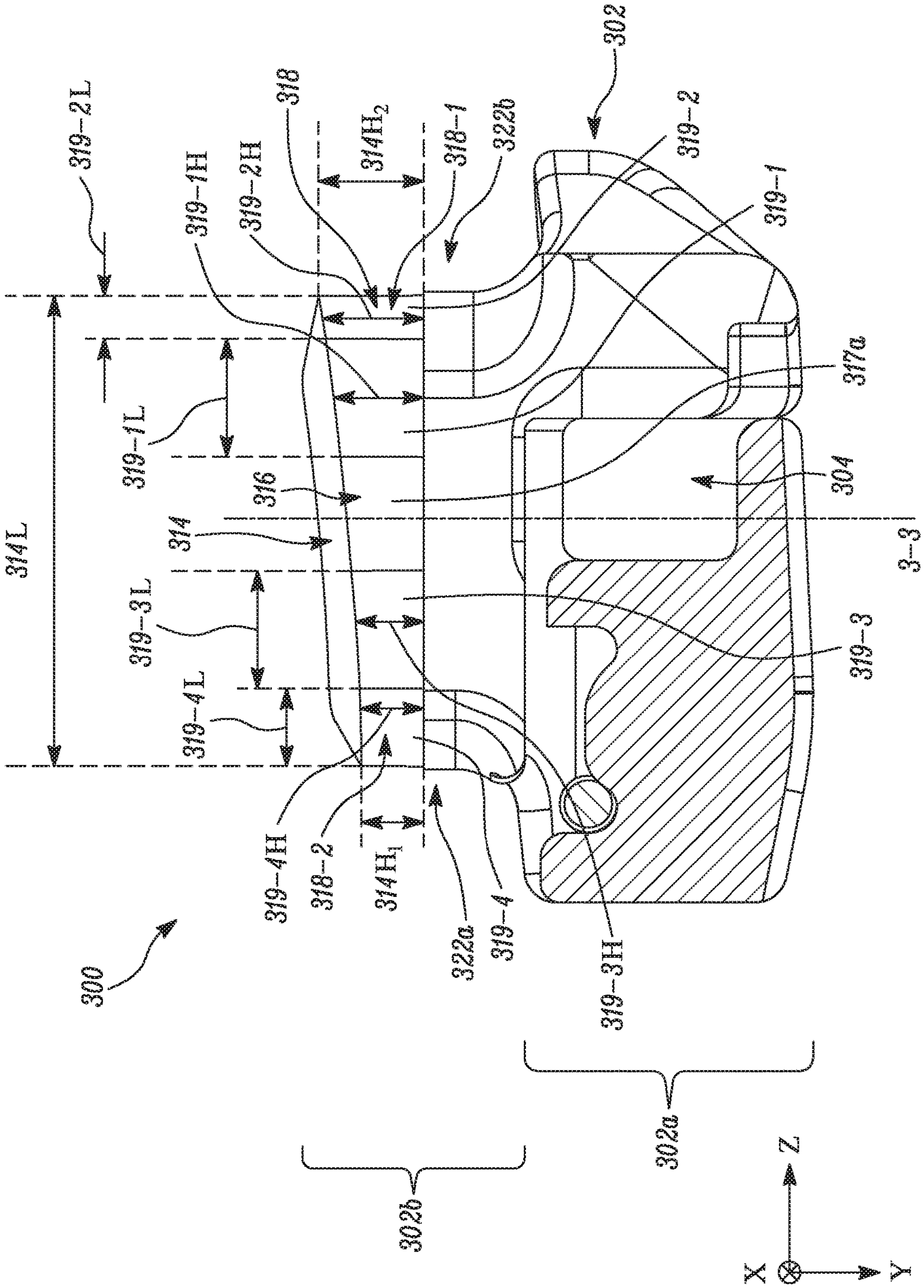
FIG. 5C is a sectional side view of the orthodontic appliance of FIG. 5A according to an embodiment of the present disclosure.

FIGS. 5A-5C illustrate an orthodontic appliance 300 according to another embodiment of the present disclosure. The orthodontic appliance 300 may have a function substantially similar to that of the orthodontic appliance 100

(shown in FIGS. 2A-3C). The orthodontic appliance 300 defines mutually orthogonal X, Y and Z-axes substantially similar to the orthodontic appliance 100. Further, the orthodontic appliance 300 may include a base substantially similar to the base 112 of the orthodontic appliance 100. However, the base of the orthodontic appliance 300 is not shown in FIGS. 5A-5C for illustrative purposes. Furthermore, the dental composition 150 (shown in FIG. 2C) is not shown in FIGS. 5A-5C for illustrative purposes.

Referring to FIGS. 5A and 5B, the orthodontic appliance 300 includes a body 302. The body 302 defines a first portion 302*a* and a second portion 302*b*. The first portion 302*a* defines a slot 304 for receiving the archwire 70 (shown in FIG. 1). The second portion 302*b* includes a bottom surface 306 opposite to the first portion 302*a*. The second portion 302*b* further includes a lateral surface 308 extending from the bottom surface 306 towards the first portion 302*a* along a longitudinal axis 3-3. The longitudinal axis 3-3 may be equivalent to the longitudinal axis 1-1 shown in FIG. 3A. The bottom surface 306 and the lateral surface 308 at least partially form an external surface 310 of the body 302.

The second portion 302*b* defines a cavity 314 at least partially surrounded by the bottom surface 306. The cavity 314 at least partially extends along a length of the second portion 302*b* from the bottom surface 306. The cavity 314 may at least partially extend along the length of the second portion 302*b* from the bottom surface 306 along the longitudinal axis 3-3. In the illustrated embodiment of FIGS. 5A and 5B, the cavity 314 at least partially extends along the length of the second portion 302*b* from the bottom surface 306. Further, the cavity 314 extends from the bottom surface 306 substantially along the Y-axis. In some embodiments, the second portion 302*b* further includes a cavity surface 324 offset from the bottom surface 306. The cavity surface 324 may be offset from the bottom surface 306 substantially along the longitudinal axis 3-3. In some embodiments, the cavity 314 extends from the bottom surface 306 towards the cavity surface 324 along the longitudinal axis 3-3.

In the illustrated embodiment of FIGS. 5A and 5B, the bottom surface 306 includes a first region 306*a* and a second region 306*b*. In some embodiments, the cavity 314 is disposed between the first region 306*a* of the bottom surface 306 and the second region 306*b* of the bottom surface 306.

The cavity 314 includes a reservoir 316. In the illustrated embodiment of FIGS. 5A-5C, the reservoir 316 is defined by a first reservoir wall 317*a* and a second reservoir wall 317*b*. The first and second reservoir walls 317*a*, 317*b* may extend from the bottom surface 306 to the cavity surface 324 substantially along the longitudinal axis 3-3. In some embodiments, each of the first and second reservoir walls 317*a*, 317*b* may be substantially planar. In some other embodiments, at least one of the first and second reservoir walls 317*a*, 317*b* may be curved. Furthermore, in the illustrated embodiment of FIGS. 5A and 5B, the reservoir 316 is centrally located with respect to the bottom surface 306.

The cavity 314 further includes at least one passage 318 disposed in fluid communication with the reservoir 316. The at least one passage 318 extends from the reservoir 316 to a lateral surface 308. In the illustrated embodiment of FIGS. 5A-5C, the at least one passage includes a plurality of passages 318 spaced apart from each other. Each passage 318 from the plurality of passages 318 extends from the reservoir 316 to the lateral surface 308.

In the illustrated embodiment of FIGS. 5A-5C, the at least one passage 318 includes two passages. Specifically, the at least one passage 318 includes a first passage 318-1 extending from the reservoir 316 to the lateral surface 308. The at least one passage 318 further includes a second passage 318-2 spaced apart from the first passage 318-1 and extending from the reservoir 316 to the lateral surface 308. Furthermore, the first passage 318-1 is angularly spaced from the second passage 318-2 by about 180 degrees. The first passage 318-1 and a second passage 318-2 may be interchangeably referred to as “the at least one passage 318-1” and “the at least one passage 318-2”, respectively.

As shown in FIG. 5B, the at least one passage 318-1 includes a first passage portion 319-1 and a second passage portion 319-2. Specifically, the first passage 318-1 includes the first and second passage portions 319-1, 319-2. The first passage portion 319-1 is disposed between the reservoir 316 and the second passage portion 319-2. The first passage portion 319-1 includes a first width 319-1W orthogonal to the longitudinal axis 3-3. Further, the second passage portion 319-2 is adjacent to the first passage portion 319-1 and includes a second width 319-2W orthogonal to the longitudinal axis 3-3. In the illustrated embodiments of FIGS. 5A-5C, the first and second widths 319-1W, 319-2W may be substantially along the X-axis. In some embodiments, the first width 319-1W is greater than the second width 319-2W.

Furthermore, in some embodiments, the at least one passage 318-2 includes a first passage portion 319-3 and a second passage portion 319-4. Specifically, the second passage 318-2 includes the first and second passage portions 319-3, 319-4. The first passage portion 319-3 is disposed between the reservoir 316 and the second passage portion 319-4. The first passage portion 319-3 includes a first width 319-3W orthogonal to the longitudinal axis 3-3. Further, the second passage portion 319-4 is adjacent to the first passage portion 319-3. The second passage portion 319-4 includes a second width 319-4W orthogonal to the longitudinal axis 3-3. In the illustrated embodiments of FIGS. 5A-5C, the first and second widths 319-3W, 319-4W may be substantially along the X-axis. In some embodiments, the first width 319-3W is greater than the second width 319-4W.

In some embodiments, the first passage portions 319-1, 319-3 and the second passage portions 319-2, 319-4 are substantially planar. In some other embodiments, at least one of the first passage portions 319-1, 319-3 and the second passage portions 319-2, 319-4 may be curved. Further, the reservoir 316 includes a width 316W. In some embodiments, the width 316W of the reservoir 316 is greater than each of the first widths 319-1W, 319-3W and the second widths 319-2W. 319-4W of the first passage portions 319-1, 319-3 and the second passage portions 319-2, 319-4, respectively.

FIG. 5C illustrates a sectional side view of the orthodontic appliance 300 taken along the longitudinal axis 3-3. Specifically, the sectional side view of the orthodontic appliance 300 is taken along the Y-Z plane. Referring to FIG. 5C, in some embodiments, the cavity 314 extends between a first end 322*a* and an opposing second end 322*b*. The cavity 314 has a first height 314$H_1$ at the first end 322*a* along the longitudinal axis 3-3. Furthermore, the cavity 314 has a second height 314$H_2$ at the second end 322*b* along the longitudinal axis 3-3. As shown in FIG. 5C, in some embodiments, the first height 314$H_1$ of the cavity 314 is less than the second height 314$H_2$ of the cavity 314. In some embodiments, a height of the cavity 314 along the longitudinal axis 3-3 increases monotonically from the first height to 314$H_1$ the second height 314$H_2$ with respect to a length 314L of the cavity 314. The length 314L of the cavity 314 may be substantially along the Z-axis. Furthermore, a rate of change of the height of the cavity 314 with respect to the length 314L of the cavity 314 changes along at least a portion of the cavity 314. Specifically, in the illustrated embodiment of FIG. 5C, the rate of change of the height of the cavity 314 with respect to the length 314L of the cavity 314 from the second passage portion 319-4 of the cavity 314 to the first passage portion 319-3. Furthermore, the rate of change of the height of the cavity 314 with respect to the length 314L of the cavity 314 changes from the first passage portion 319-3 to the reservoir 316 of the cavity 314. Moreover, the rate of change of the height of the cavity 314 with respect to the length 314L of the cavity 314 changes from the first passage portion 319-1 to the second passage portion 319-2. In some embodiments, the rate of change of the height of the cavity 314 with respect to the length 314L may be substantially constant in each of the first passage portion 319-1, the second passage portion 319-2, the reservoir 316, the first passage portion 319-3, and the second passage portion 319-4. In other words, the height of the cavity 314 with respect to the length 314L may increase substantially linearly in each of the first passage portion 319-1, the second passage portion 319-2, the reservoir 316, the first passage portion 319-3, and the second passage portion 319-4.

In some embodiments, a height 319-1H of the first passage portion 319-1 increases along a length 319-1L of the first passage portion 319-1. Further, a height 319-2H of the second passage portion 319-2 increases along a length 319-2L of the second passage portion 319-2. The lengths 319-1L, 319-2L of the first and second passage portions 319-1, 319-2, respectively, may be substantially along the Z-axis. Furthermore, the heights 319-1H, 319-2H of the first and second passage portions 319-1, 319-2, respectively, may be substantially along the Y-axis.

In some embodiments, a height 319-3H of the first passage portion 319-3 increases along a length 319-3L of the first passage portion 319-3. Further, a height 319-4H of the second passage portion 319-4 increases along a length 319-4L of the second passage portion 319-4. The lengths 319-3L, 319-4L of the first and second passage portions 319-3, 319-4, respectively, may be substantially along the Z-axis. Furthermore, the heights 319-3H, 319-4H of the first and second passage portions 319-3, 319-4, respectively, may be substantially along the Y-axis.

As shown in FIG. 5C, in some embodiments, the first passage portion 319-1 has a first rate of change of the height 319-1H with respect to the length 319-1L of the first passage portion 319-1. Further, the second passage portion 319-2 has a second rate of change of the height 319-2H with respect to the length 319-2L of the second passage portion 319-2. The first rate of change of the height 319-1H is different from the second rate of change of the height 319-2H. Specifically, the first rate of change of the height 319-1H is less than the second rate of change of the height 319-2H.

Moreover, the first passage portion 319-3 has a first rate of change of the height 319-3H with respect to the length of the first passage portion 319-3. The second passage portion 319-4 has a second rate of change of the height 319-4H with respect to the length of the second passage portion 319-4. The first rate of change of the height 319-3H is different from the second rate of change of the height 319-4H. Specifically, the first rate of change of the height 319-3H is greater than the second rate of change of the height 319-4H.

In some embodiments, the orthodontic system 10 (shown in FIG. 1) includes the orthodontic appliance 300. In some embodiments, the orthodontic appliance 300 further includes the dental composition 150 (shown in FIG. 2C) received within the reservoir 316. In some embodiments, the reservoir 316 is configured to retain the dental composition 150 within the reservoir 316. The reservoir 316 may retain the dental composition 150 within the reservoir 316 by mechanical interaction of the dental composition 150 and the reservoir 316. The reservoir 316 may secure the dental composition 150 within the cavity 314. That is, the reservoir 316 may prevent the dental composition 150 to be removed from the cavity 314. Therefore, the reservoir 316 may prevent the dental composition 150 from being dislodged into an oral environment of a patient from the cavity 314. Furthermore, the orthodontic appliance 300 may provide safe, efficient, sustained and continuous release of elements from the dental composition 150 into the oral environment of the patient during a course of orthodontic treatments. The elements (for example, fluoride, calcium, strontium, phosphate) released into the oral environment may further deposit on surfaces of the teeth 50 (shown in FIG. 1). Therefore, the orthodontic appliance 300 may reduce or prevent oral and dental diseases. In some embodiments, the dental composition 150 may be additionally coated on the body 302 of the orthodontic appliance 300.

Figure 6B:
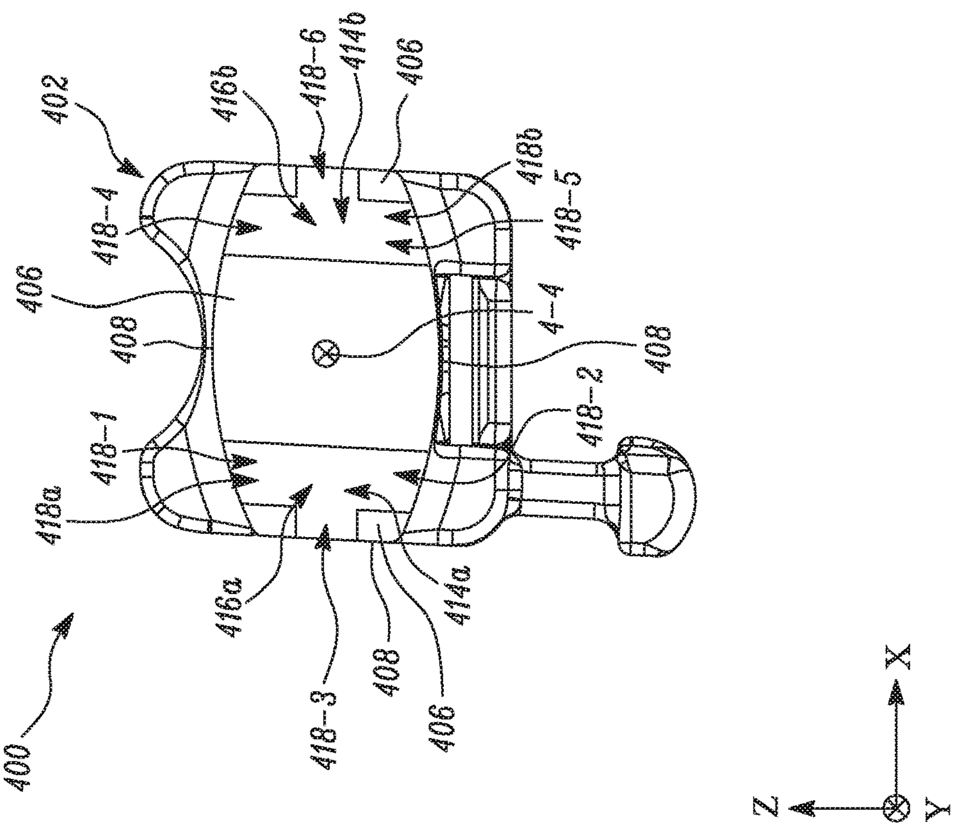
FIG. 6B is a bottom view of the orthodontic appliance of FIG. 6A according to an embodiment of the present disclosure.
Figure 6A:
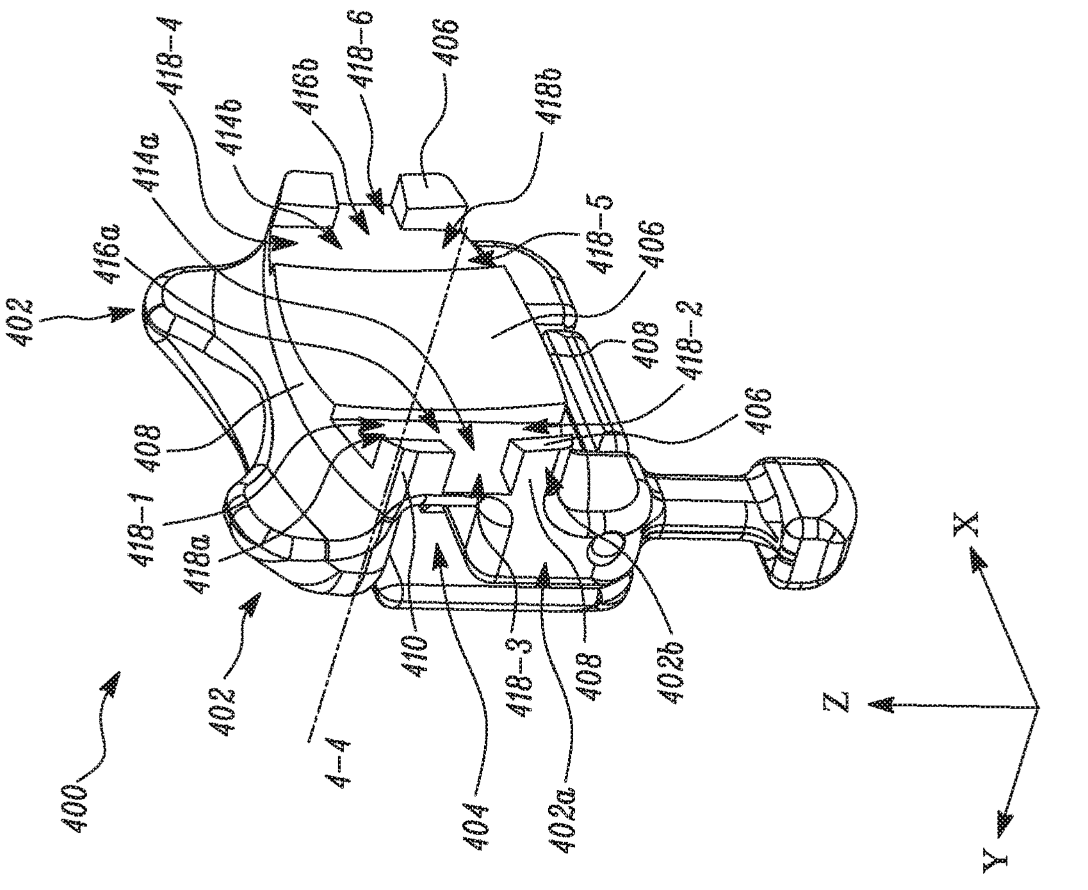
FIG. 6A is a perspective view of an orthodontic appliance according to another embodiment of the present disclosure.

FIGS. 6A and 6B illustrate an orthodontic appliance 400 according to another embodiment of the present disclosure. The orthodontic appliance 400 may have a function substantially similar to that of the orthodontic appliance 100 (shown in FIGS. 2A-3C). The orthodontic appliance 400 defines mutually orthogonal X, Y and Z-axes substantially similar to the orthodontic appliance 100. Further, the orthodontic appliance 400 may include a base substantially similar to the base 112 of the orthodontic appliance 100. However, the base of the orthodontic appliance 400 is not shown in FIGS. 6A and 6B for illustrative purposes. Furthermore, the dental composition 150 (shown in FIG. 2C) is not shown in FIGS. 6A and 6B for illustrative purposes.

The orthodontic appliance 400 includes a body 402. The body 402 defines a first portion 402*a* and a second portion 402*b*. The first portion 402*a* defines a slot 404 for receiving the archwire 70 (shown in FIG. 1). The second portion 402*b* includes a bottom surface 406 opposite to the first portion 402*a*. The second portion 402*b* further includes a lateral surface 408 extending from the bottom surface 406 towards the first portion 402*a* along a longitudinal axis 4-4. The longitudinal axis 4-4 may be equivalent to the longitudinal axis 1-1 shown in FIG. 3A. The bottom surface 406 and the lateral surface 408 at least partially form an external surface 410 of the body 402.

The second portion 402*b* defines a cavity 414*a* at least partially surrounded by the bottom surface 406. The cavity 414*a* at least partially extends along a length of the second portion 402*b* from the bottom surface 406. Furthermore, the cavity 414*a* is substantially T-shaped in a plane orthogonal to the longitudinal axis 4-4. The plane orthogonal to the longitudinal axis 4-4 may be the X-Z plane. The cavity 414*a* includes a reservoir 416*a* and at least one passage 418*a* disposed in fluid communication with the reservoir 416*a*. The at least one passage 418*a* extends from the reservoir 416*a* to the lateral surface 408.

In some embodiments, the at least one passage 418*a* includes a plurality of passages 418*a* spaced apart from each other. Each passage 418*a* from the plurality of passages 418*a* extends from the reservoir 416*a* to the lateral surface 408. In the illustrated embodiment of FIGS. 6A and 6B, the at least one passage 418*a* includes three passages. Specifically, the at least one passage 418*a* includes a first passage 418-1 extending from the reservoir 416*a* to the lateral surface 408. The at least one passage 418*a* further includes a second passage 418-2 spaced apart from the first passage 418-1 and extending from the reservoir 416*a* to the lateral surface 408. In some embodiments, the first and second passages 418-1, 418-2 may extend from the reservoir 416*a* to the lateral surface 408 substantially along the Z-axis. Therefore, in some embodiments, the first passage 418-1 is angularly spaced from the second passage 418-2 by about 180 degrees. In some embodiments, the at least one passage 418*a* further includes a third passage 418-3 spaced apart from the first passage 418-1 and extending from the reservoir 416*a* to the lateral surface 408. In some embodiments, the third passage 418-3 may extend from the reservoir 416*a* to the lateral surface 408 substantially along the X-axis. Therefore, in some embodiments, the third passage 418-3 is angularly spaced from each of the first and second passages 418-1, 418-2 by about 90 degrees.

In some embodiments, the second portion 402*b* further defines a cavity 414*b* at least partially surrounded by the bottom surface 406. The cavity 414*b* at least partially extends along the length of the second portion 402*b* from the bottom surface 406. Furthermore, the cavity 414*b* is substantially T-shaped in a plane orthogonal to the longitudinal axis 4-4. The plane orthogonal to the longitudinal axis 4-4 may be the X-Z plane. The cavity 414*b* includes a reservoir 416*b* and at least one passage 418*b* disposed in fluid communication with the reservoir 416*b*. The at least one passage 418*b* extends from the reservoir 416*b* to the lateral surface 408.

In the illustrated embodiment of FIGS. 6A and 6B, the at least one passage 418*b* includes a plurality of passages 418*b* spaced apart from each other. Each passage 418*b* from the plurality of passages 418*b* extends from the reservoir 416*b* to the lateral surface 408. In the illustrated embodiment of FIGS. 6A and 6B, the at least one passage 418*b* includes three passages. Specifically, the at least one passage 418*b* includes a first passage 418-4 extending from the reservoir 416*b* to the lateral surface 408. The at least one passage 418*b* further includes a second passage 418-5 spaced apart from the first passage 418-1 and extending from the reservoir 416*b* to the lateral surface 408. In some embodiments, the first and second passages 418-4, 418-5 may extend from the reservoir 416*b* to the lateral surface 408 substantially along the Z-axis. Therefore, in some embodiments, the first passage 418-4 is angularly spaced from the second passage 418-5 by about 180 degrees. In some embodiments, the at least one passage 418*b* further includes a third passage 418-6 spaced apart from the first passage 418-4 and extending from the reservoir 416*b* to the lateral surface 408. In some embodiments, the third passage 418-6 may extend from the reservoir 416*b* to the lateral surface 408 substantially along the X-axis. Therefore, in some embodiments, the third passage 418-6 is angularly spaced from each of the first and second passages 418-4, 418-5 by about 90 degrees.

In some embodiments, the orthodontic system 10 (shown in FIG. 1) includes the orthodontic appliance 400. A configuration of the cavities 414*a*, 414*b* of the orthodontic appliance 400 may be suitable for an orthodontic appliance that cannot accommodate a cavity in a central area of a bottom surface. For example, the orthodontic appliance 400 may be used with a cuspid tooth where a cavity may not be accommodated in a central region of the bottom surface 406. As shown in FIGS. 6A and 6B, the cavities 414*a*, 414*b* may be provided proximal to edges of the orthodontic appliance 400.

In some embodiments, the orthodontic appliance 400 further includes the dental composition 150 (shown in FIG. 2C) received within each of the reservoirs 416*a*, 416*b*. In some embodiments, each of the reservoirs 416*a*, 416*b* is configured to retain the dental composition 150 within each of the reservoirs 416*a*, 416*b*. The reservoirs 416*a*, 416*b* may retain the dental composition 150 within the reservoirs 416*a*, 416*b* by mechanical interaction of the dental composition 150 and the reservoirs 416*a*, 416*b*. Specifically, a T-shaped configuration of the cavities 414*a*, 414*b* may retain the dental composition 150 within the reservoirs 416*a*, 416*b*, respectively. The reservoirs 416*a*, 416*b* may secure the dental composition 150 within the cavities 414*a*, 414*b*, respectively. That is, the reservoirs 416*a*, 416*b* may prevent the dental composition 150 to be removed from the cavities 414*a*, 414*b*, respectively. Therefore, the reservoirs 416*a*, 416*b* may prevent the dental composition 150 from being dislodged into an oral environment of a patient from the cavities 414*a*, 414*b*, respectively. The orthodontic appliance 400 may provide safe, efficient, sustained and continuous release of elements from the dental composition 150 into the oral environment of the patient during a course of orthodontic treatments. The elements (for example, fluoride, calcium, strontium, phosphate) released into the oral environment may further deposit on surfaces of the teeth 50 (shown in FIG. 1). Therefore, the orthodontic appliance 400 may reduce or prevent oral and dental diseases. In some embodiments, the dental composition 150 may be additionally coated on the body 402 of the orthodontic appliance 400.

Figure 7:
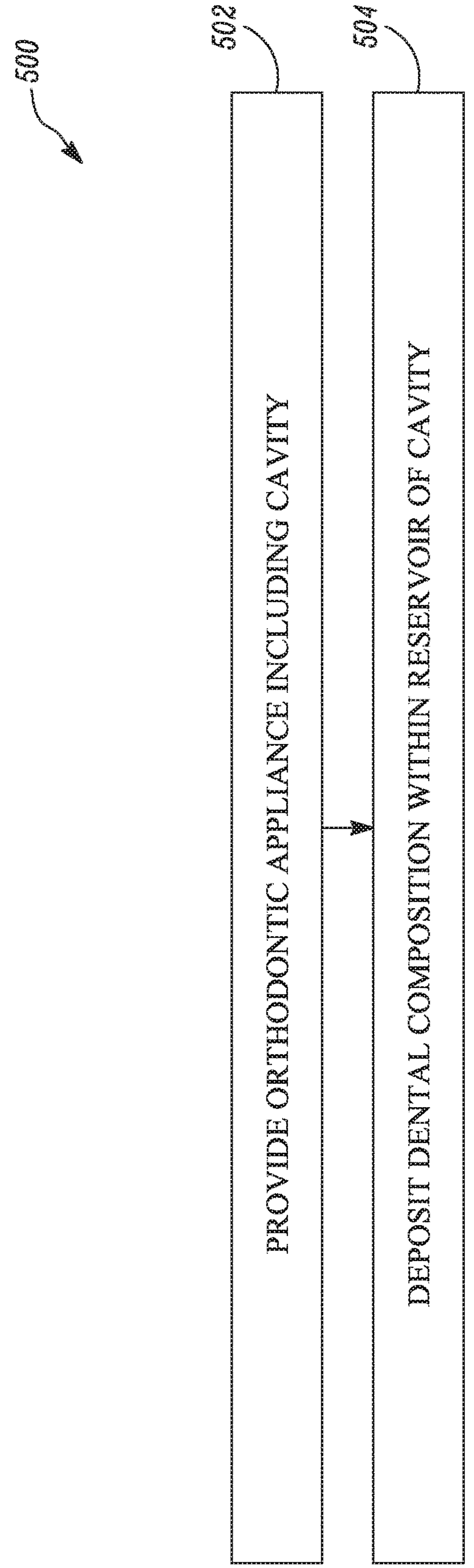
FIG. 7 is a flowchart illustrating a method according to an embodiment of the present disclosure.

FIG. 7 illustrates a method 500. The method 500 may be a method of use of each of the orthodontic appliances 100, 200, 300, 400. The method 500 will be described with reference to FIGS. 1 to 7. The method 500 includes the following steps:

At step 502, the method 500 includes providing an orthodontic appliance. The orthodontic appliance includes a body. The body includes a first portion defining a slot. The body further includes a second portion extending from the first portion along a longitudinal axis. The second portion includes a bottom surface opposite to the first portion. The second portion further includes a lateral surface extending from the bottom surface towards the first portion along the longitudinal axis. The bottom surface and the lateral surface at least partially form an external surface of the body. The second portion defines a cavity at least partially surrounded by the bottom surface. The cavity extends at least partially along a length of the second portion from the bottom surface. The cavity includes a reservoir and at least one passage disposed in fluid communication with the reservoir. The at least one passage extends from the reservoir to the lateral surface.

For example, the method 500 may include providing the orthodontic appliances 100, 200, 300, 400 including the bodies 102, 302, 302, 402, respectively. The bodies 102, 202, 302, 402 include the first portions 102*a*, 202*a*, 302*a*, 402*a* defining the slots 104, 204, 304, 404, respectively. The second portions 102*b*, 202*b*, 302*b*, 402*b* extend from the first portions 102*a*, 202*a*, 302*a*, 402*a* along the longitudinal axes 1-1, 2-2, 3-3, 4-4, respectively. The second portions 102*b*, 202*b*, 302*b*, 402*b* include the bottom surfaces 106, 206, 306, 406 opposite to the first portions 102*a*, 202*a*, 302*a*, 402*a*, respectively. The second portions 102*b*, 202*b*, 302*b*, 402*b* further include the lateral surfaces 108, 208, 308, 408 extending from the bottom surfaces 106, 206, 306, 406 towards the first portions 102*a*, 202*a*, 302*a*, 402*a* along the longitudinal axes 1-1, 2-2, 3-3, 4-4, respectively. The bottom surfaces 106, 206, 306, 406 and the lateral surfaces 108, 208, 308, 408 at least partially form the external surfaces 110, 210, 310, 410 of the bodies 102, 202, 302, 402, respectively.

The second portions 102*b*, 202*b*, 302*b* define the cavities 114, 214, 314 at least partially surrounded by the bottom surfaces 106, 206, 306, respectively. Further, the second portion 402*b* defines the cavities 414*a*, 414*b* at least partially surrounded by the bottom surface 406.

The cavities 114, 214, 314 extend at least partially along the lengths of the second portions 102*b*, 202*b*, 302*b* from the bottom surfaces 106, 206, 306, respectively. Further, the cavities 414*a*, 414*b* extend at least partially along the length of the second portion 402*b* from the bottom surface 406.

The cavities 114, 214, 314 include the reservoirs 116, 216, 316 and the at least one passages 118, 218, 318 disposed in fluid communication with the reservoirs 116, 216, 316, respectively. Further, the cavities 414*a*, 414*b* include the reservoirs 416*a*, 416*b* and the at least one passages 418*a*, 418*b* disposed in fluid communication with the reservoirs 416*a*, 416*b*, respectively.

The at least one passages 118, 218, 318 extend from the reservoirs 116, 216, 316, to the lateral surfaces 108, 208, 308, respectively. Further, the at least one passages 418*a*, 418*b* extend from the reservoirs 416*a*, 416*b* to the lateral surface 408, respectively.

At step 504, the method 500 includes depositing a dental composition within the reservoir of the cavity. For example, the method 500 may include depositing the dental composition 150 within the reservoirs 116, 216, 316 of the cavities 114, 214, 314, respectively. Further, the method 500 may include depositing the dental composition 150 within the reservoirs 416*a*, 416*b* of the cavities 414*a*, 414*b*, respectively.

In some embodiments, the dental composition 150 is at least one of the fluoride-releasing composition, the calcium-releasing composition, the strontium-releasing composition, and the phosphate-releasing composition. The dental composition 150 may be deposited within the reservoirs 116, 216, 316, 416*a*, 416*b* by various methods. In some embodiments, the dental composition 150 may be directly injected into the reservoirs 116, 216, 316, 416*a*, 416*b*. In some embodiments, the dental composition 150 may include a self-cure glass ionomer and/or a resin modified glass ionomer (RMGI). The self-cure glass ionomer and the RMGI may cure itself after injection into the reservoirs 116, 216, 316, 416*a*, 416*b* and may be secured within the cavities 114, 214, 314, 414*a*, 414*b*, respectively. Examples of self-cure glass ionomer and RMGI include, but are not limited to, RelyX™ Luting plus, Ketac™ Cem, Fujicem®, Fuji IX, and the like.

Some RMGI products, such as Ketac™ Nano, Varnish™ XT, and Fuji LC, may need to be cured by light. The resin in such products may be cured with redox curing agents, such as tertial amine and benzyl peroxide. In some embodiments, the resin in such products may alternatively be cured with thermal initiators at an elevated temperature (for example, 70° C.). Examples of the thermal initiators include, but are not limited to, benzyl peroxide, potassium persulfate, and the like. However, due to shelf-life concern, a paste of the product with the redox curing agents and the thermal initiators may need to be compounded and used within several days. The paste with the redox curing agents and the thermal initiators may be injected into the cavities 114, 214, 314, of the orthodontic appliances 100, 200, 300, respectively. Further, the paste with the redox curing agents and the thermal initiators may be injected into the cavities 414*a*, 414*b* of the orthodontic appliance 400.

The RMGI products, such as Ketac™ Nano, Varnish™ XT, and Fuji LC, may also be cured in molds similar in shape to the cavities 114, 214, 314 outside of the orthodontic appliances 100, 200, 300 and then transferred into the cavities 114, 214, 314 of the orthodontic appliances 100, 200, 300, respectively. Further, the RMGI products, such as Ketac™ Nano, Varnish™ XT, and Fuji LC, may also be cured in molds similar in shape to the cavities 414*a*, 414*b* outside of the orthodontic appliance 400 and then transferred into the cavities 414*a*, 414*b* of the orthodontic appliance 400.

The glass ionomers and resin modified glass ionomers curable compositions according to the present disclosure may include one or more additional components, such as, for example, solvent, antioxidants, flavorants, fluoridating agents, buffering agents, numbing agents, remineralization agents, basic fillers, desensitization agents, colorants, indicator(s), viscosity modifiers, surfactants, stabilizers, preservative agents (e.g., benzoic acid), or a combination thereof. The buffering agents can be selected from phosphate buffer, citrate buffer, and carboxylate buffer. The remineralization agents can be selected from calcium salts, such as calcium phosphate, calcium hydrogen phosphate, calcium dihydrogen phosphate, calcium chloride, calcium nitrite, calcium carbonate, calcium lactate, and strontium salts, such as strontium chloride, strontium nitrite, strontium lactate, etc. The fluoridating agents can be selected from sodium fluoride, ammonium fluoride, potassium fluoride, zinc fluoride, silver diamine fluoride, and fluosilane. The basic fillers may be selected from Portland cement and mineral trioxide aggregate (MTA).

In some embodiments, the dental composition 150 may include fluoride varnish. In such embodiments, a fluoride coating may be injected into the cavities 114, 214, 314, 414*a*, 414*b*, and then dried under various conditions to remove solvents and form solids with active ingredients in the solids. This process may be repeated to completely fill the cavities 114, 214, 314, 414*a*, 414*b*. Such dental compositions may be additionally coated over the bodies 102, 202, 302, 402 of the orthodontic appliances 100, 200, 300, 400, respectively.

These compositions from fluoride varnishes and other coating material that can be dried in the structure according to the present disclosure may include one or more additional components such as, for example, solvent, antioxidants, flavorants, fluoridating agents, buffering agents, numbing agents, remineralization agents, basic fillers, desensitization agents, colorants, indicator(s), viscosity modifiers, surfactants, stabilizers, preservative agents (e.g., benzoic acid), or a combination thereof. The buffering agents can be selected from phosphate buffer, citrate buffer, and carboxylate buffer. The remineralization agents can be selected from calcium salts, such as calcium phosphate, calcium hydrogen phosphate, calcium dihydrogen phosphate, calcium chloride, calcium nitrite, calcium carbonate, calcium lactate, and strontium salts, such as strontium chloride, strontium nitrite, strontium lactate, etc. The fluoridating agents can be selected from sodium fluoride, ammonium fluoride, potassium fluoride, zinc fluoride, silver diamine fluoride, and fluosilane. The basic fillers may be selected from Portland cement and mineral trioxide aggregate (MTA).

In some embodiments, the dental composition 150 may be inserted/injected into the cavities 114, 214, 314, 414*a*, 414*b* before different parts of the orthodontic appliances 100, 200, 300, 400 are assembled together by a suitable process (e.g., laser welding). Specifically, in some embodiments, the method 500 further includes engaging a base with the bottom surface of the second portion of the body, and attaching the base to a tooth. For example, the method 500 may further include engaging the base 112 with the bottom surfaces 106, 206, 306, 406 of the second portions 102*b*, 202*b*, 302*b*, 402*b* of the bodies 102, 202, 302, 402, respectively, and attaching the base 112 to the tooth 50.

In some embodiments, the method 500 further includes at least partially receiving an archwire within the slot of the first portion of the body. For example, the method 500 may further include at least partially receiving the archwire 70 within the slots 104, 204, 304, 404 of the first portions 102*a*, 202*a*, 302*a*, 402*a* of the bodies 102, 202, 302, 402, respectively.

EXPERIMENTAL RESULTS

Figure 8:
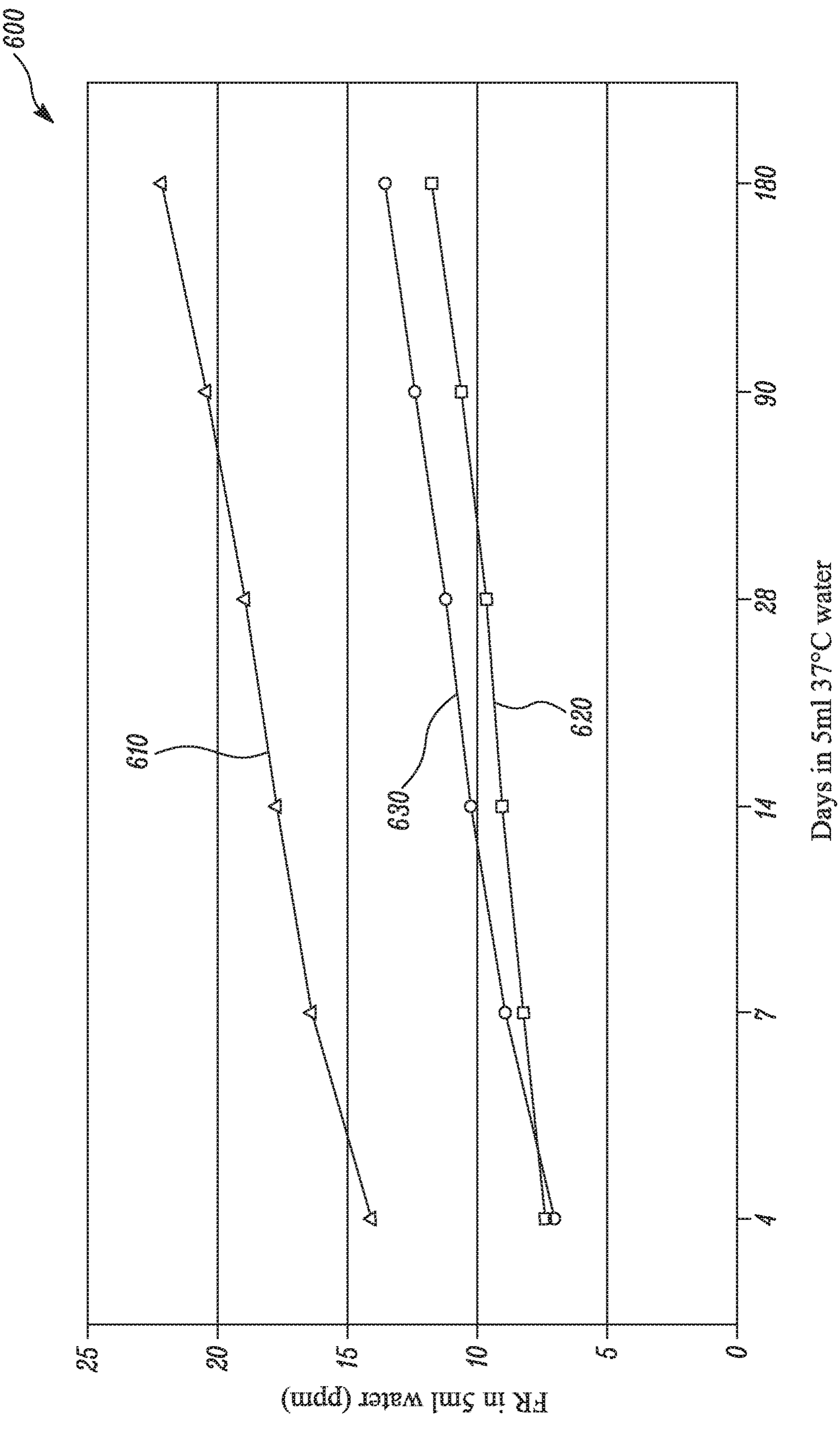
FIG. 8 is an exemplary graph illustrating a variation of a cumulative fluoride release with respect to time.

FIG. 8 illustrates a graph 600 depicting a cumulative fluoride release (in parts per million) in 5 ml of 37° C. water based on an experiment conducted on the orthodontic appliance 100 (shown in FIG. 2C) of the present disclosure. The 5 ml of 37° C. water was used to replicate an oral environment of a patient. An equal amount of a fluoride-releasing composition (RelyX™ Luting Plus cement) was provided on different regions of the orthodontic appliance 100.

Particularly, the fluoride-releasing composition was:

1. Coated on a top of the orthodontic appliance 100,
2. Coated on edges of the orthodontic appliance 100, and
3. Injected within the reservoir 116 of the orthodontic appliance 100.

The cumulative fluoride release from the fluoride-releasing composition provided on the different regions of the orthodontic appliance 100 was observed for 180 days, and the experiment was repeated three times for each of the different coating regions.

An average cumulative fluoride release (in ppm) for each of the different coating regions is depicted in the graph 600. Specifically, in the graph 600, an average cumulative fluoride release from the fluoride-releasing composition coated on the top of the orthodontic appliance 100 is depicted by triangles and by a curve 610. Furthermore, an average cumulative fluoride release from the fluoride-releasing composition coated on the edges of the orthodontic appliance 100 is depicted by squares and by a curve 620. Moreover, an average cumulative fluoride release from the fluoride release composition injected within the reservoir 116 of the orthodontic appliance 100 is depicted by circles and by a curve 630.

The average cumulative fluoride release along with a standard deviation (in brackets in Table 1) for each of the different coating regions of the cumulative fluoride release is provided in Table 1 below.

TABLE 1

| | Time (days) | | | | | |
|---|---|---|---|---|---|---|
| | 4 | 7 | 14 | 28 | 90 | 180 |
| Top coated (ppm) | 14.0 (2.7) | 16.3 (3.2) | 17.7 (3.4) | 18.9 (3.6) | 20.4 (3.8) | 22.1 (3.7) |
| Edge coated (ppm) | 7.34 (0.8) | 8.2 (0.99) | 9.0 (1.0) | 9.6 (1.0) | 10.6 (1.2) | 11.7 (1.3) |
| Reservoir injected (ppm) | 7.0 (0.78) | 8.9 (1.4) | 10.2 (1.0) | 11.2 (1.0) | 12.4 (1.1) | 13.5 (1.2) |

Referring to FIG. 8 and Table 1, as shown by the curve 610, the average cumulative fluoride release from the fluoride-releasing composition coated on the top of the orthodontic appliance 100 was observed to be high. A high cumulative fluoride release may result in fluoride toxicity. Additionally, coating the fluoride-releasing composition on the top of the orthodontic appliance 100 may reduce an application life of the fluoride-releasing composition. In some cases, the application life of the fluoride-releasing composition coated on the top of the orthodontic appliance 100 may be less than a period of an orthodontic treatment. In some cases, the fluoride-releasing composition coated on the top of the orthodontic appliance 100 may be dispensed substantially before the period of the orthodontic treatment has lapsed.

Furthermore, as shown by the curve 620, the average cumulative fluoride release from the fluoride-releasing composition coated on the edges of the orthodontic appliance 100 was observed to be less than the average cumulative fluoride release from the fluoride-releasing composition coated on the top of the orthodontic appliance 100 (shown by the curve 610). Particularly, coating the fluoride-releasing composition on the edges of the orthodontic appliance 100 may result in a longer application life of the fluoride-releasing composition. However, the cumulative fluoride release from the fluoride-releasing composition coated on the edges of the orthodontic appliance 100 may be difficult to control. Specifically, a volume of the fluoride-releasing composition coated on the orthodontic appliance 100 may be limited by a size of the orthodontic appliance 100. Therefore, the volume of the fluoride-releasing composition may not be selected as per desired application attributes. In other words, a desired volume of the fluoride-releasing composition may not correspond to an available area on the edges of the orthodontic appliance 100.

As shown by the curve 630, the average cumulative fluoride release from the fluoride-releasing composition injected within the reservoir 116 of the orthodontic appliance 100 was observed to be sustained and continuous throughout the experiment. Furthermore, coating the fluoride-releasing composition within the reservoir 116 of the orthodontic appliance 100 may result in a long application life of the fluoride-releasing composition. A volume of the fluoride-releasing composition may be selected as per desired application attributes. Further, the volume of the fluoride-releasing composition may be reliably injected within the reservoir 116. Moreover, a risk of fluoride toxicity may be substantially reduced. These findings were further verified with another experiment.

Figure 9:
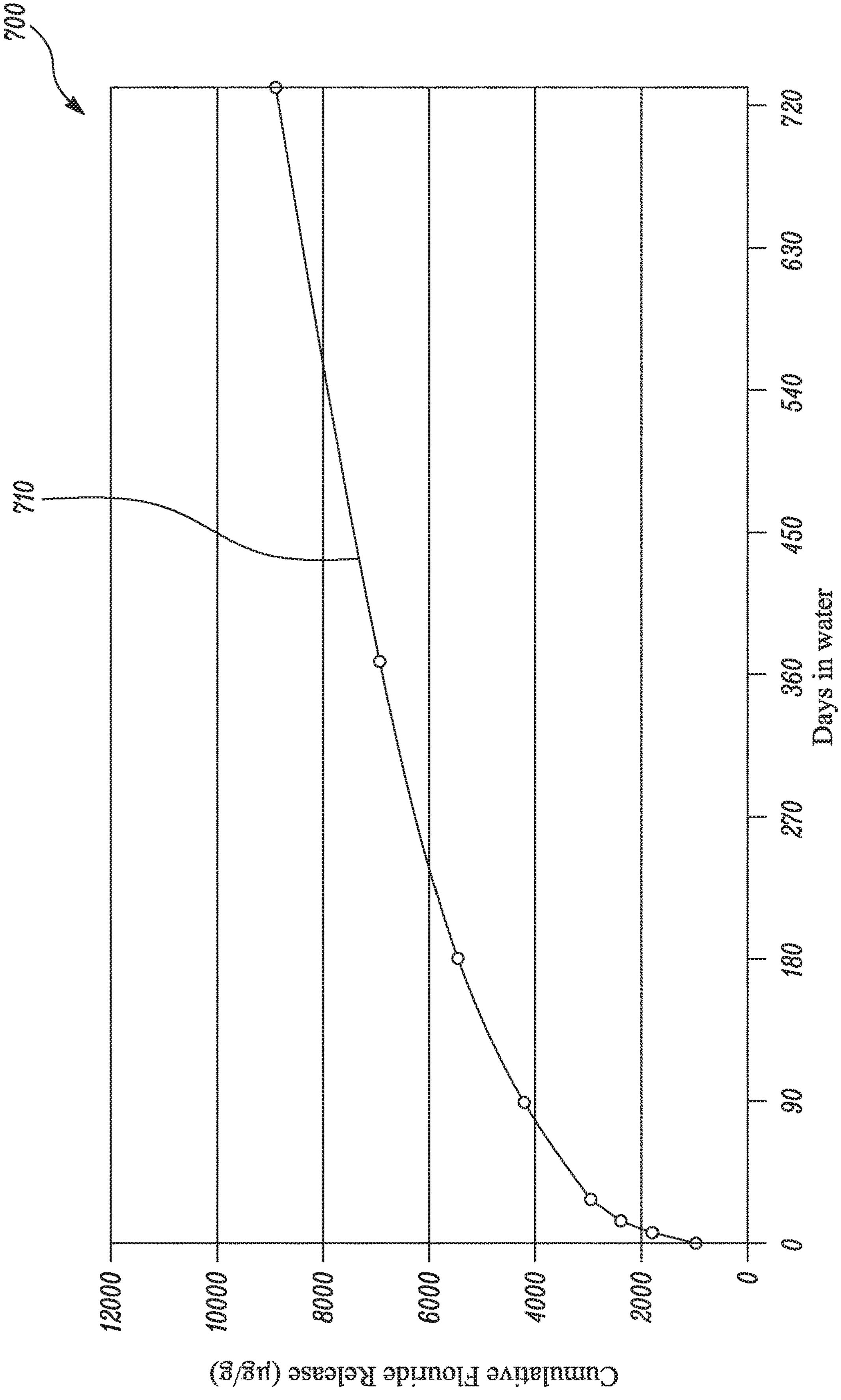
FIG. 9 is an exemplary graph illustrating a variation of a cumulative fluoride release with respect to time.

FIG. 9 illustrates a graph 700 depicting a variation between a cumulative fluoride release from the fluoride-releasing composition injected within the reservoir 116 of the orthodontic appliance 100 and time (days) in 37° C. water based on an experiment conducted on the orthodontic appliance 100 over a period of two years (720 days). The experiment was performed three times. An average cumulative fluoride release is depicted in the graph 700. The average cumulative fluoride release along with a standard deviation (stdev) of the cumulative fluoride release is provided in Table 2 below.

TABLE 2

| | Time (days) | | | | | | | | |
|---|---|---|---|---|---|---|---|---|---|
| | 1 | 7 | 14 | 28 | 60 | 90 | 185 | 365 | 720 |
| FR mean (μg/g) | 765 | 1592 | 1183 | 2808 | 3602 | 4237 | 5303 | 6648 | 8848 |
| FR stdev (μg/g) | 31 | 51 | 57 | 68 | 69 | 69 | 77 | 86 | 89 |

Referring to FIG. 9 and Table 2, a curve 710 depicts the average cumulative fluoride release from the fluoride-releasing composition injected within the reservoir 116 of the orthodontic appliance 100 over the period of two years. It may be noted that fluoride release continued for the period of two years. Therefore, the orthodontic appliance 100 may provide safe, sustained and continuous fluoride delivery in an oral environment of a patient throughout a period of an orthodontic treatment.

Another experiment was performed to verify whether the fluoride released from the fluoride-releasing composition (RelyX™ Luting Plus cement) injected within the reservoir 116 of the orthodontic appliance 100 interacted with an enamel of a tooth. In a first sample, an enamel was submerged in an artificial saliva. In a second sample, an identical enamel was submerged in water along with four of the orthodontic appliances 100 with the fluoride-releasing composition injected within the reservoirs 116 placed near the enamel. The experiment was conducted three times, and an average fluoride uptake along with a standard deviation of the fluoride uptake by the enamel was calculated.

Figure 10:
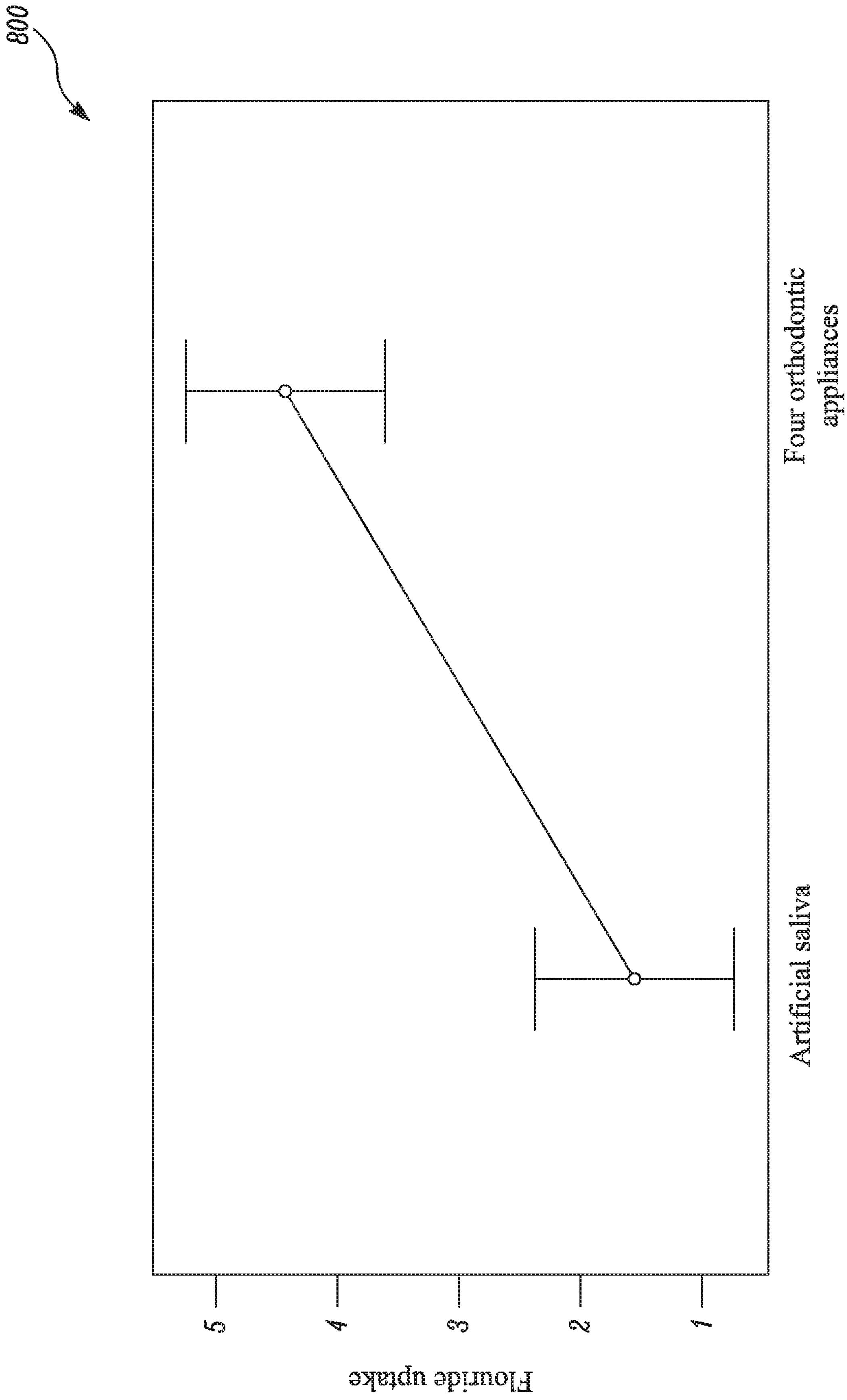
FIG. 10 is an exemplary graph illustrating fluoride uptake on an enamel of a tooth.

FIG. 10 illustrates a graph 800 depicting the average fluoride uptake on the enamel from the two samples. The experiment was performed three times. A mean fluoride uptake and a standard deviation of the fluoride uptake (in brackets) was calculated and is tabulated in Table 3 provided below.

TABLE 3

| Sample | Mean fluoride uptake and standard deviation (μg/g) |
|---|---|
| Artificial saliva | 1.55 (0.25) |
| Four orthodontic appliances 100 | 4.43 (1.73) |

Referring to FIG. 10 and Table 3, the average fluoride uptake on the enamel from four of the orthodontic appliances 100 with the fluoride-releasing composition injected within the reservoirs 116 is more than the average fluoride uptake on the enamel surface treated with the artificial saliva. Therefore, the orthodontic appliance 100 may provide efficient fluoride uptake on enamels of the plurality of teeth 50 (shown in FIG. 1).

In the orthodontic system 10 (shown in FIG. 1), 12 of the orthodontic appliances 100, 200, 300, 400 may require an amount of the fluoride-releasing composition about the same as the amount required for cementation of a single crown. Furthermore, a total fluoride releasing area of 12 orthodontic appliances 100, 200, 300, 400 may be about 5 times more than that of the single crown. Therefore, the orthodontic system 10 may be more efficient in fluoride delivery than the single crown.

It will be appreciated that the arrangements presented herein may be varied in any number of aspects while still remaining within the scope of the disclosures herein.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An orthodontic appliance comprising:

a body comprising a first portion defining a slot for receiving an archwire and a second portion extending from the first portion along a longitudinal axis, wherein the second portion comprises a bottom surface opposite to the first portion and a lateral surface extending from the bottom surface towards the first portion along the longitudinal axis, the bottom surface and the lateral surface at least partially forming an external surface of the body, wherein the body is part of a self-ligating bracket, wherein the second portion defines a cavity at least partially surrounded by the bottom surface and at least partially extending along a length of the second portion from the bottom surface, and wherein the cavity comprises a reservoir having a circular shape in a plane normal to the longitudinal axis and at least one passage disposed in fluid communication with the reservoir and extending from the reservoir to the lateral surface.

2. The orthodontic appliance of claim 1, further comprising a base comprising a first base surface configured to engage the bottom surface of the second portion of the body and a second base surface opposite to the first base surface and configured to be attached to a tooth.

3. The orthodontic appliance of claim 1, further comprising a dental composition received within the reservoir.

4. The orthodontic appliance of claim 1, wherein the dental composition is at least one of: a fluoride-releasing composition, a calcium-releasing composition, a strontium-releasing composition, or a phosphate-releasing composition.

5. The orthodontic appliance of claim 1, wherein the at least one passage comprises a plurality of passages spaced apart from each other, and wherein each passage from the plurality of passages extends from the reservoir to the lateral surface.

6. The orthodontic appliance of claim 5, wherein the plurality of passages comprises two passages, and wherein the passages are angularly spaced apart by about 180 degrees.

7. The orthodontic appliance of claim 5, wherein a height of a first passage portion increases along a length of the first passage portion, and wherein a height of a second passage portion increases along a length of the second passage portion, wherein the first passage portion has a first rate of change of the height with respect to the length of the first passage portion, wherein the second passage portion has a second rate of change of the height with respect to the length of the second passage portion, and wherein the first rate of change of the height is different from the second rate of change of the height.

8. The orthodontic appliance of claim 1, wherein the second portion comprises a cavity surface offset from the bottom surface, and wherein the cavity extends from the bottom surface towards the cavity surface along the longitudinal axis.

9. The orthodontic appliance of claim 8, wherein at least one of the reservoir and at least a portion of the cavity is tapered from the bottom surface to the cavity surface.

10. The orthodontic appliance of claim 1, wherein at least one of: (a) the cavity is disposed between a first region of the bottom surface and a second region of the bottom surface, or (b) the reservoir is centrally located with respect to the bottom surface.

11. The orthodontic appliance of claim 1, wherein the at least one passage is substantially U-shaped in a plane parallel to each of the longitudinal axis and a width of the at least one passage.

12. An orthodontic system for a plurality of teeth, the orthodontic system comprising:

an archwire; and a plurality of orthodontic appliances configured to be removably coupled to the archwire, each orthodontic appliance from the plurality of orthodontic appliances comprising:

a body comprising a first portion defining a slot for receiving the archwire and a second portion extending from the first portion along a longitudinal axis, wherein the second portion comprises a bottom surface opposite to the first portion and a lateral surface extending from the bottom surface towards the first portion along the longitudinal axis, the bottom surface and the lateral surface at least partially forming an external surface of the body, wherein the second portion defines a cavity at least partially surrounded by the bottom surface and at least partially extending along a length of the second portion from the bottom surface, wherein the cavity comprises a reservoir having a circular shape in a plane normal to the longitudinal axis and at least one passage disposed in fluid communication with the reservoir and extending from the reservoir to the lateral surface, wherein the reservoir is configured to retain a dental composition within the reservoir and to prevent the dental composition from being dislodged from the reservoir except via the at least one passage; and a base comprising a first base surface configured to engage the bottom surface of the second portion of the body and a second base surface opposite to the first base surface and configured to be attached to a corresponding tooth from the plurality of teeth.

13. The orthodontic system of claim 12, wherein the cavity is disposed between a first region of the bottom surface and a second region of the bottom surface.

14. The orthodontic system of claim 12, wherein each orthodontic appliance from the plurality of orthodontic appliances is a self-ligating bracket and the reservoir is configured to provide sustained release of the dental composition through the at least one passage during orthodontic treatment.

15. The orthodontic system of claim 12, wherein the second portion comprises a cavity surface offset from the bottom surface along the longitudinal axis, wherein the cavity extends from the bottom surface toward the cavity surface along the longitudinal axis, and wherein the reservoir is tapered from the bottom surface to the cavity surface such that a maximum width of the reservoir at the bottom surface is greater than a maximum width of the reservoir at the cavity surface.

16. The orthodontic system of claim 12, further comprising a dental composition received within the reservoir, wherein the dental composition comprises at least one of a fluoride-releasing composition, a calcium-releasing composition, a strontium-releasing composition, or a phosphate-releasing composition.

17. A method comprising:

providing an orthodontic appliance comprising a self-ligating bracket, the self-ligating bracket comprising a body comprising a first portion defining a slot and a second portion extending from the first portion along a longitudinal axis, wherein the second portion comprises a bottom surface opposite to the first portion and a lateral surface extending from the bottom surface towards the first portion along the longitudinal axis, the bottom surface and the lateral surface at least partially forming an external surface of the body, wherein the second portion defines a cavity at least partially surrounded by the bottom surface and extending at least partially along a length of the second portion from the bottom surface, and wherein the cavity comprises a reservoir having a circular shape in a plane normal to the longitudinal axis and at least one passage disposed in fluid communication with the reservoir and extending from the reservoir to the lateral surface; and depositing a dental composition within the reservoir of the cavity.

18. The method of claim 17, further comprising engaging a base with the bottom surface of the second portion of the body, and attaching the base to a tooth.

19. The method of claim 17, wherein the at least one passage comprises two passages spaced apart by about 180 degrees.

20. The method of claim 17, wherein the dental composition is a fluoride-releasing composition.

* * * * *